United States Patent
Hirose et al.

(10) Patent No.: US 9,639,590 B2
(45) Date of Patent: May 2, 2017

(54) DATABASE SYSTEM AND METHOD FOR SEARCHING DATABASE

(71) Applicant: FUJITSU LIMITED, Kawasaki-shi, Kanagawa (JP)

(72) Inventors: Atsuhito Hirose, Odawara (JP); Toshihiro Kawakami, Yokohama (JP); Akihiro Yamamoto, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 352 days.

(21) Appl. No.: 14/269,238

(22) Filed: May 5, 2014

(65) Prior Publication Data

US 2014/0358934 A1    Dec. 4, 2014

(30) Foreign Application Priority Data

May 30, 2013   (JP) .................................. 2013-113984

(51) Int. Cl.
   *G06F 17/30*       (2006.01)
(52) U.S. Cl.
   CPC .. *G06F 17/30575* (2013.01); *G06F 17/30427* (2013.01); *G06F 17/30445* (2013.01); *G06F 17/30483* (2013.01); *G06F 17/30595* (2013.01); *G06F 17/30598* (2013.01); *G06F 17/30864* (2013.01); *G06F 17/30997* (2013.01)
(58) Field of Classification Search
   CPC ......... G06F 17/30864; G06F 17/30545; G06F 17/30943; G06F 17/30477; G06F 17/30433; G06F 17/30595; G06F 17/30483; G06F 17/30575; G06F 17/30445; G06F 17/30997; G06F 17/30427; G06F 17/30598
   See application file for complete search history.

(56) References Cited

U.S. PATENT DOCUMENTS

| | | | | |
|---|---|---|---|---|
| 5,664,172 A | * | 9/1997 | Antoshenkov | G06F 17/30433 707/700 |
| 6,353,821 B1 | * | 3/2002 | Gray | G06F 17/30321 707/715 |
| 6,439,783 B1 | * | 8/2002 | Antoshenkov | G06F 17/30433 |
| 6,633,640 B1 | * | 10/2003 | Cohen | H04Q 3/0091 379/112.06 |

(Continued)

FOREIGN PATENT DOCUMENTS

| | | |
|---|---|---|
| JP | 2002-207735 | 7/2002 |
| JP | 2006-134191 | 5/2006 |

(Continued)

OTHER PUBLICATIONS

Japanese Office Action mailed Nov. 29, 2016 for corresponding Japanese Patent Application No. 2013-113984, with Partial English Translation, 5 pages.

*Primary Examiner* — Srirama Channavajjala

(74) *Attorney, Agent, or Firm* — Fujitsu Patent Center

(57) ABSTRACT

A plurality of servers are each coupled to a different one of a plurality of databases that are synchronized with each other. A search request specifying a search range is sent from a search-requesting device to the servers. Each server calculates a search subrange from the search range specified in the search request received from the search-requesting device, performs a data search operation only within the calculated search subrange of the database coupled thereto, and sends a search result back to the search-requesting device.

10 Claims, 33 Drawing Sheets

(56) References Cited

U.S. PATENT DOCUMENTS

| | | | |
|---|---|---|---|
| 6,829,606 B2 * | 12/2004 | Ripley | G06F 17/30477 |
| 7,689,545 B2 | 3/2010 | Matsubayashi et al. | |
| 8,402,052 B2 * | 3/2013 | Sano | G06F 17/30333 |
| | | | 706/10 |
| 8,447,757 B1 * | 5/2013 | Cox | G06F 9/5061 |
| | | | 707/720 |
| 2002/0093522 A1 | 7/2002 | Koskas | G06F 17/30595 |
| | | | 715/700 |
| 2002/0095421 A1 * | 7/2002 | Koskas | G06F 17/30595 |
| 2003/0187841 A1 * | 10/2003 | Zhang | G06F 17/30864 |
| 2004/0177064 A1 * | 9/2004 | Satoh | G06F 17/30637 |
| 2005/0055345 A1 * | 3/2005 | Ripley | G06F 17/30477 |
| 2005/0203901 A1 * | 9/2005 | Waldvogel | G06F 17/30545 |
| 2007/0028039 A1 * | 2/2007 | Gupta | G11C 15/00 |
| | | | 711/108 |
| 2007/0239759 A1 * | 10/2007 | Shen | G06F 17/30094 |
| 2008/0243836 A1 | 10/2008 | Miyoshi | |
| 2010/0082655 A1 * | 4/2010 | Silberstein | G06F 17/30477 |
| | | | 707/759 |
| 2010/0106712 A1 * | 4/2010 | Mizutani | G06F 17/30091 |
| | | | 707/715 |
| 2010/0235390 A1 * | 9/2010 | Sano | G06F 17/30333 |
| | | | 707/770 |
| 2011/0145210 A1 * | 6/2011 | Rathinam | G06F 17/30997 |
| | | | 707/705 |
| 2011/0320446 A1 * | 12/2011 | Chakrabarti | G06F 17/30979 |
| | | | 707/737 |
| 2012/0191697 A1 * | 7/2012 | Sherman | G06F 17/30427 |
| | | | 707/717 |
| 2013/0080463 A1 * | 3/2013 | Yamada | G06F 17/30442 |
| | | | 707/769 |
| 2015/0212999 A1 * | 7/2015 | Alvey | G06F 17/245 |
| | | | 715/227 |

FOREIGN PATENT DOCUMENTS

| | | |
|---|---|---|
| JP | 2006-228060 | 8/2006 |
| JP | 2008-250722 A | 10/2008 |
| JP | 2012-059215 | 3/2012 |

* cited by examiner

FIG. 14

| PROCESSING REQUEST MESSAGE | | | | | | 51 |
|---|---|---|---|---|---|---|
| CONTROL DATA | PARALLELISM FLAG | TYPE | TABLE | COLUMN | CONDITION | |
| DATA A | TRUE | SELECT | T01 | C01, C02 | C01>10 AND C01<100 | |

FIG. 16

| PROCESSING RESULT MESSAGE | | |
|---|---|---|
| CONTROL DATA | DIRECT DESIGNATION FLAG | PROCESSING RESULT |
| 3:1:DATA A | TRUE | (20,aa), (25,bb) |

CALCULATE LIMIT RANGE

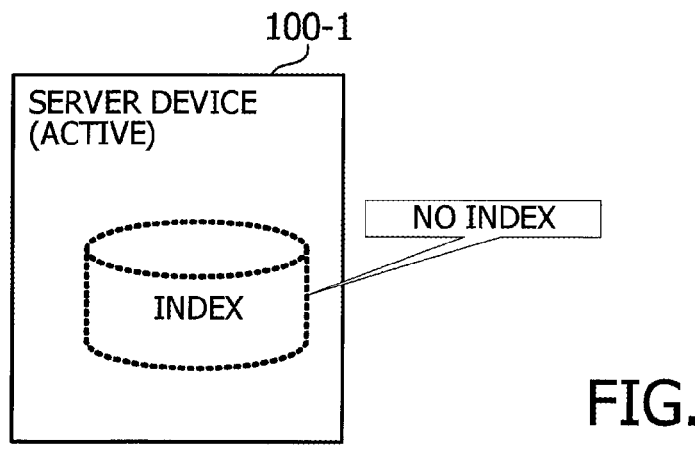
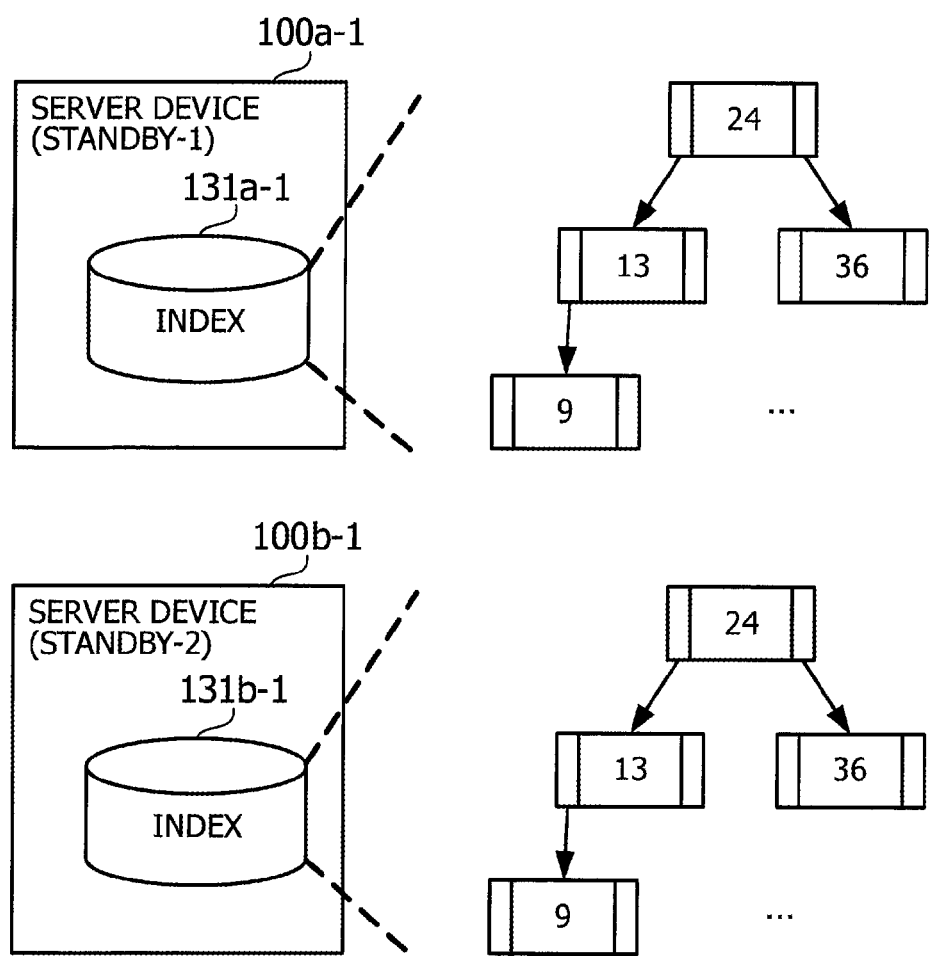
FIG. 32

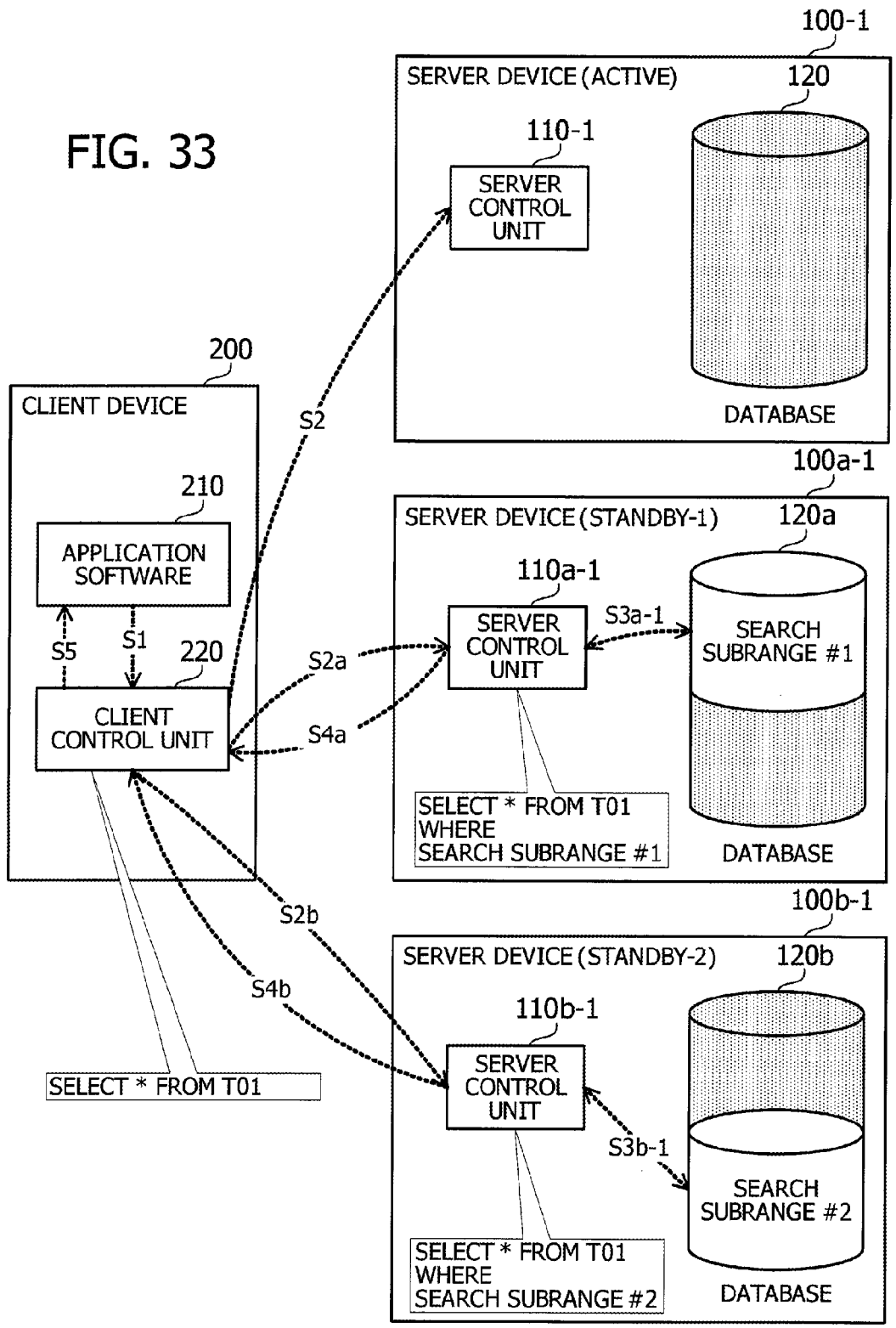

DATABASE SYSTEM AND METHOD FOR SEARCHING DATABASE

CROSS-REFERENCE TO RELATED APPLICATION

This application is based upon and claims the benefit of priority of the prior Japanese Patent Application No. 2013-113984, filed on May 30, 2013, the entire contents of which are incorporated herein by reference.

FIELD

The embodiments discussed herein relate to a database system and a method for searching database.

BACKGROUND

Client-server database systems are widely used today, in which a server provides a plurality of clients with database services by running a set of software called the database management system (DBMS). A client sends the server a search request containing specific search conditions, and the server responds to the requesting client by searching the database to retrieve and output data records that match with the specified search conditions. Some of those search conditions may specify a range of values of a particular attribute of data records, or a particular column of a data table, in the database.

As one solution for enhancing the responsiveness to search requests, a parallel database system employs multiple servers that operate in parallel under DBMS. Parallel database systems may be built with, for example, the Shared Everything (SE) architecture or Shared Nothing (SN) architecture. The SE architecture permits a plurality of servers to make direct access to a shared database that is implemented on a storage device accessible to every server. In contrast, the SN architecture previously divides the records of a database into a plurality of partitions for different servers, so that each server is supposed to make access to its corresponding partition. Since different partitions reside in different storage devices, one server makes access to other servers' partitions not directly, but with the intervention of those other servers. It is less frequent for a server to conflict with another server in database access. The SN architecture is thus advantageous over the SE architecture in terms of load distribution and suitability for throughput enhancement.

One proposed data retrieval system includes an application server and a database server, the application server containing a plurality of central processing unit (CPU) cores to execute data search operations. This application server divides a given search condition into multiple search conditions and assigns them to a plurality of search operation units each having a CPU core. Each search operation unit sends the database server a Structured Query Language (SQL) statement corresponding to a divided search condition. The application server then merges partial search results corresponding to the divided portions of the search condition. See, for example, Japanese Laid-open Patent Publication No. 2012-59215.

As seen from the above, the request response time of a database system is reduced by assigning a plurality of servers to a single search operation. To demarcate the scope of each server, the database may previously be divided into a plurality of partitions as done in the SN architecture. One thing to consider in this partitioning is that the number of participating servers may change during the operations of the parallel database system, because the system may be expanded with additional servers or encounter failure of existing servers. The noted partitioning of database, however, consumes extra time and resources to reestablish the partitions each time the number of servers changes.

SUMMARY

In one aspect of the embodiments, there is proposed a database system including a plurality of servers and a search-requesting device. The servers are each coupled to a different one of a plurality of databases that are synchronized with each other. The search-requesting device is configured to send a search request specifying a search range to the plurality of servers. Each server is configured to calculate a search subrange from the search range specified in the search request received from the search-requesting device, perform a data search operation only within the calculated search subrange of the database coupled thereto, and send a search result back to the search-requesting device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 14 illustrates an example of processing request messages;

FIG. 16 illustrates an example of processing result messages;

FIG. 32 illustrates a variation of functional structure of server devices; and FIG. 33 illustrates a variation of how the proposed system executes a search.

DESCRIPTION OF EMBODIMENTS

Several embodiments of the present invention will be described below with reference to the accompanying drawings.

(a) First Embodiment

Figure 1:
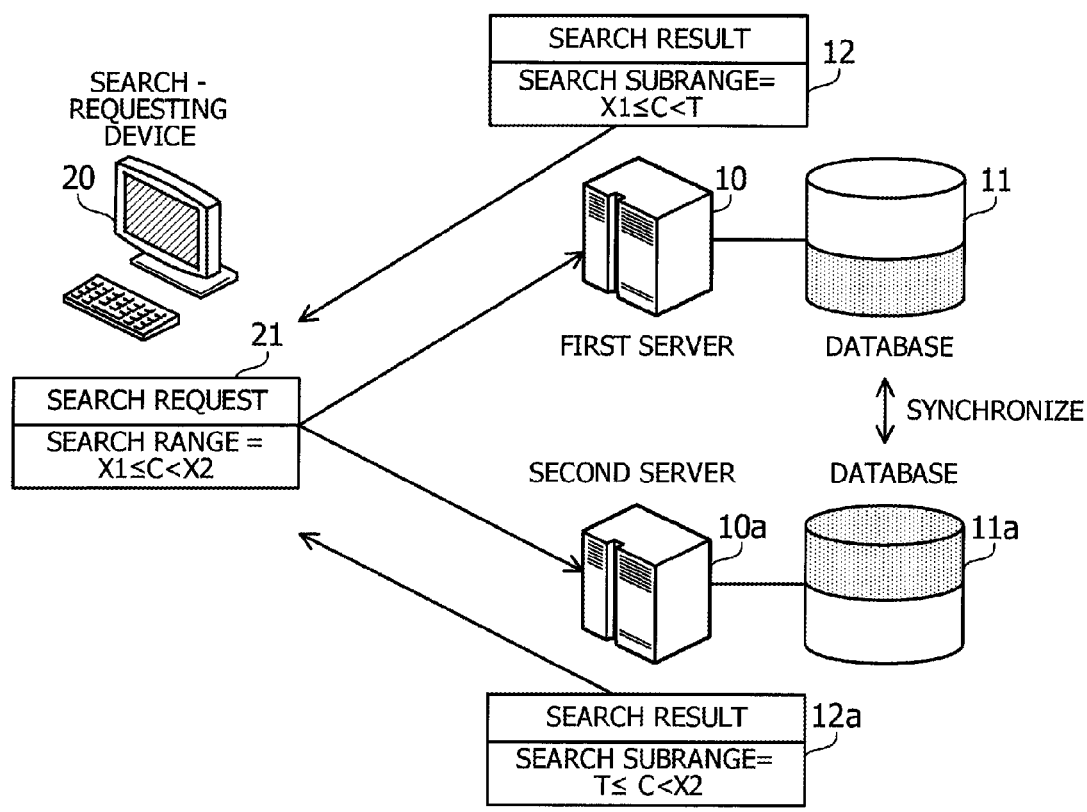
FIG. 1 illustrates a database system according to a first embodiment.

FIG. 1 illustrates a database system according to a first embodiment. The illustrated database system of the first embodiment includes first and second servers 10 and 10*a* (and other servers not depicted) and a search-requesting device 20. The two servers 10 and 10*a* are, for example, server devices (e.g., server computers) that receive and execute requests from the search-requesting device 20. The search-requesting device 20 is a client device (e.g., client computer) that makes access to the first and second servers 10 and 10*a*. This search-requesting device 20 may be, for example, a user's terminal device. The search-requesting device 20 may also be a server device, or may even be an intermediary device or relaying server that makes access to the first and second servers 10 and 10*a* upon request from a client device. The first and second servers 10 and 10*a* communicate with the search-requesting device 20 via a network. Alternatively, the search-requesting device 20 may be integrated in one of the servers.

For the purpose of information processing described below, the first and second servers 10 and 10*a* and search-requesting device 20 may have a processor and a memory so that, for example, the processor executes programs stored in the memory. The processor may be a CPU, digital signal processor (DSP), application-specific integrated circuit (ASIC), or field-programmable gate array (FPGA), or a combination of the same. It is noted that the term "processor" is not limited to a single processor, but may also refer to a multi-processor system including a plurality of processor devices. The memory may be random access memory (RAM) or other kind of storage devices.

The servers are deployed together with databases. The databases 11 and 11*a* seen in FIG. 1 are such databases. These databases are subject to synchronization, so that they will contain identical data. Each server is coupled to one of those databases. For example, the first server 10 is linked to one database 11 while the second server 10*a* to another database 11*a*. One server makes access to its attached database, but has no access to databases of other servers. For example, the first server 10 makes access to its attached database 11, but not to the other database 11*a*. The second server 10*a* makes access to its attached database 11*a*, but not to the other database 11.

For example, the databases are implemented on different storage devices, which may be non-volatile storage devices such as hard disk drives (HDD), or may be volatile memory devices such as RAM. A server and its associated database may co-reside in the server enclosure or may be located in separate enclosures. In either case, the server is said to be "connected" to the database. The connection between a server and a remote database in the latter case may involve switches or other intermediate network devices.

The search-requesting device 20 sends a search request to the first and second servers 10 and 10*a* (and others, if any), which specifies a single search range as one of the search conditions. Suppose, for example, that the search-requesting device 20 sends a search request 21 to both the first and second servers 10 and 10*a*, as seen in FIG. 1, by using multicast or broadcast transmission. This search request 21 specifies a specific search range of $X1 \leq C < X2$, meaning that the value of attribute C is greater than or equal to X1 and smaller than X2.

Upon receipt of this search request from the search-requesting device 20, each receiving server calculates a search subrange that represents for which part of the specified search range the server is responsible. For example, the first server 10 undertakes a search subrange $X1 \leq C < T$ out of the specified search range $X1 \leq C < X2$. This search subrange means that the first server 10 is to search for data records whose attribute C is greater than or equal to X1 and smaller than T. The second server 10*a*, on the other hand, undertakes a different search subrange $T \leq C < X2$ out of the same specified search range $X1 \leq C < X2$. This search subrange means that the second server 10*a* is to search for the data records whose attribute C is greater than or equal to T and smaller than X2.

It is preferable to configure the servers to avoid overlap between their respective search subranges, so as not to waste their processing resources with redundant searching operation. It is also preferable to configure the servers to determine their respective search subranges independently and individually, without relying upon server-to-server communication. That is, the servers execute an appropriate algorithm to determine their own search subranges individually, thus reducing overhead before they actually start search operations. For example, each participating server is assigned an appropriate priority level. The search range specified by the search request 21 is subdivided into as many search subranges as the number of participating servers, and the servers select search subranges, one for each, according to their respective priority levels.

Each server then searches its attached database for specified data records only within the search subrange determined by itself and thus sends its partial search result back to the search-requesting device 20. For example, the first server 10 retrieves data that falls in the search subrange $X1 \leq C < T$ from its attached database 11 and sends its search result 12 back to the search-requesting device 20. The second server 10*a* similarly retrieves data that falls in the search subrange $T \leq C < X2$ from its attached database 11a and sends its search result 12a back to the search-requesting device 20. The search-requesting device 20 performs some postprocessing on the two search results 12 and 12a received from the first and second servers 10 and 10a. For example, the search-requesting device 20 merges one search result 12 with the other search result 12a.

In one aspect of the above parallel searching, the entire set of search data is subdivided into a plurality of virtual partitions. While the two databases 11 and 11a actually store the same set of data, the first server 10 only sees one such virtual partition of its attached database 11. Likewise, the second server 10a only sees one virtual partition of its attached database 11a that is different from the one in the database 11 of the first server 10. The two servers 10 and 10a share the load of searching in this way.

The number of servers in the system may change due to failure of existing servers or deployment of additional servers. Virtual partitions can, however, be re-established without much processing load since there is no need for transporting data from database to database. For example, each server may be configured to calculate its own search subrange with an algorithm that uses the number of servers as a parameter for dividing a dataset. In this case, the servers automatically reconfigure their respective virtual partitions according to the current number of servers.

The database system of the first embodiment causes its constituent servers 10 and 10a to make access to different databases to execute a data search. This architecture is free from the problems related to contention of access to a single common database and thus enables a scalable increase of throughput. The proposed system also synchronizes the content of databases 11 and 11a, which ensures access to the entire data even if some server in the system happens to fail. This feature provides an increased fault tolerance.

The above two servers 10 and 10a are designed to determine their respective search subranges from a search range specified by the search-requesting device 20, so that each server will execute a search only in such a search subrange. This feature permits the servers 10 and 10a to share their load of search operations in an efficient manner. As noted above, the proposed system eliminates the need for transporting data between the databases 11 and 11a even when the number of servers in the system has changed due to failure of existing servers or deployment of additional servers. The new set of servers can adapt themselves to share the workload of search operations.

(b) Second Embodiment

Figure 2:
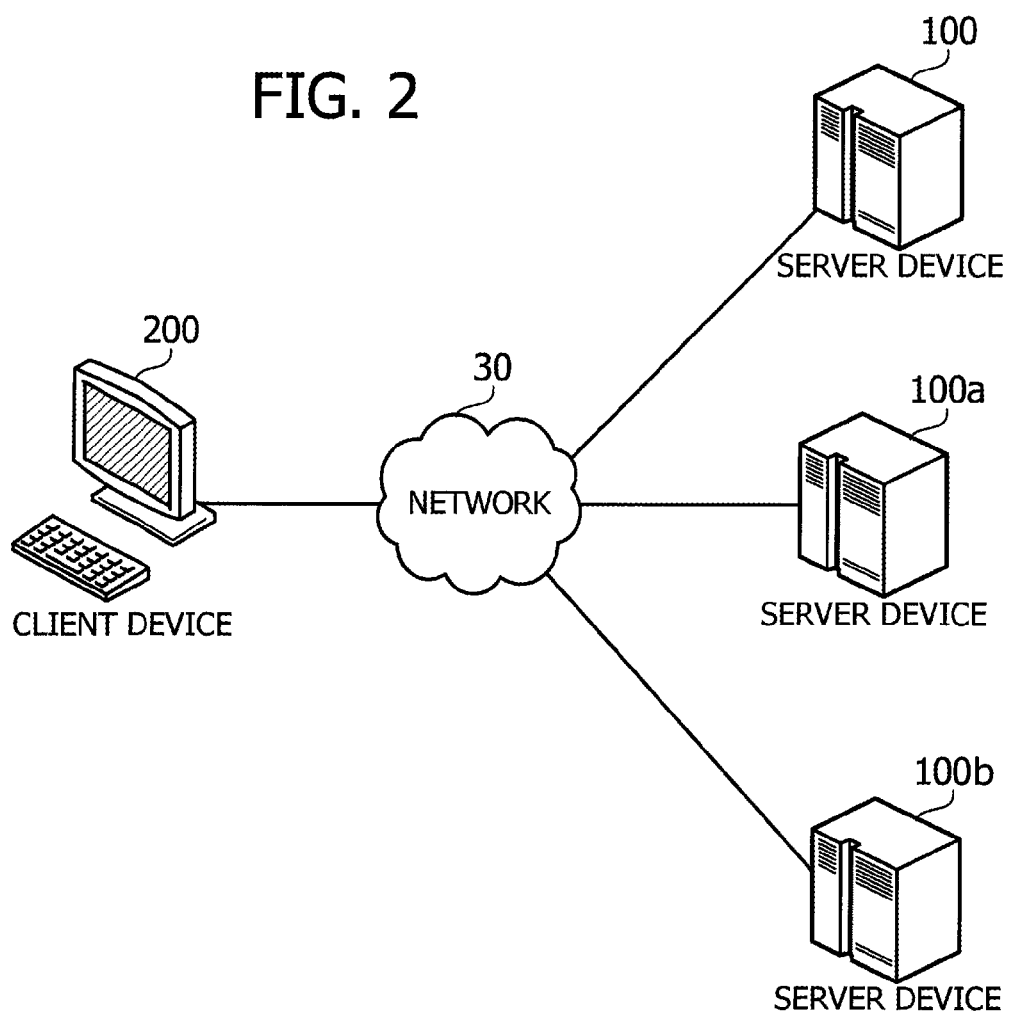
FIG. 2 illustrates a system according to a second embodiment.

FIG. 2 illustrates a system according to a second embodiment. The illustrated system of the second embodiment includes server devices 100, 100a, and 100b and a client device 200. The server devices 100, 100a, and 100b are an example of the servers 10 and 10a discussed above in the first embodiment. The client device 200 is an example of the search-requesting device 20 discussed in the first embodiment. The client device 200 is linked to the server devices 100, 100a, and 100b via a network 30. The system may include a smaller number (e.g., two) of server devices or a larger number (e.g., four) of server devices. These server devices may be organized as clusters.

The client device 200 is, for example, a desktop, laptop, or any other kind of computer on which the user runs an application program. This application program executes its tasks by using some data records in the database that the server devices 100, 100a, and 100b manage. For example, the client device 200 broadcasts a message to the server devices 100, 100a, and 100b to request update or retrieval of some data in the database. The client device 200 may act as an application server that offers application services to other terminal devices.

The server devices 100, 100a, and 100b are server computers configured to manage databases. The server devices 100, 100a, and 100b accommodate their respective databases, which are synchronized with each other. Each server device 100, 100a, and 100b accepts a request from the client device 200, executes access to the databases, and returns the result to the requesting client device 200.

These databases may be disk-based databases that store data in HDDs, or in-memory databases that store data in the primary storage for the purpose of high-speed access. Each synchronized database may be stored in an external database server device linked to the illustrated server devices.

One of the server devices is assigned the role of "active" server while the other server devices are "standby" servers. They are respectively labeled as "active," "standby-1," "standby-2," and so on. The active server device performs update and search operations on the databases. Update operations may include, for example, registration of new data records, deletion of existing data records, and the like, while search operations refer to the operation of searching a database to retrieve data records. Upon update, the active server device requests the other server devices to synchronize their databases with the updated data in its own database. In a search operation, the server devices search their corresponding databases in a parallel fashion.

When the active server device fails, one of the standby server devices (e.g., standby-1 server device) takes over the role of active server device.

Figure 3:
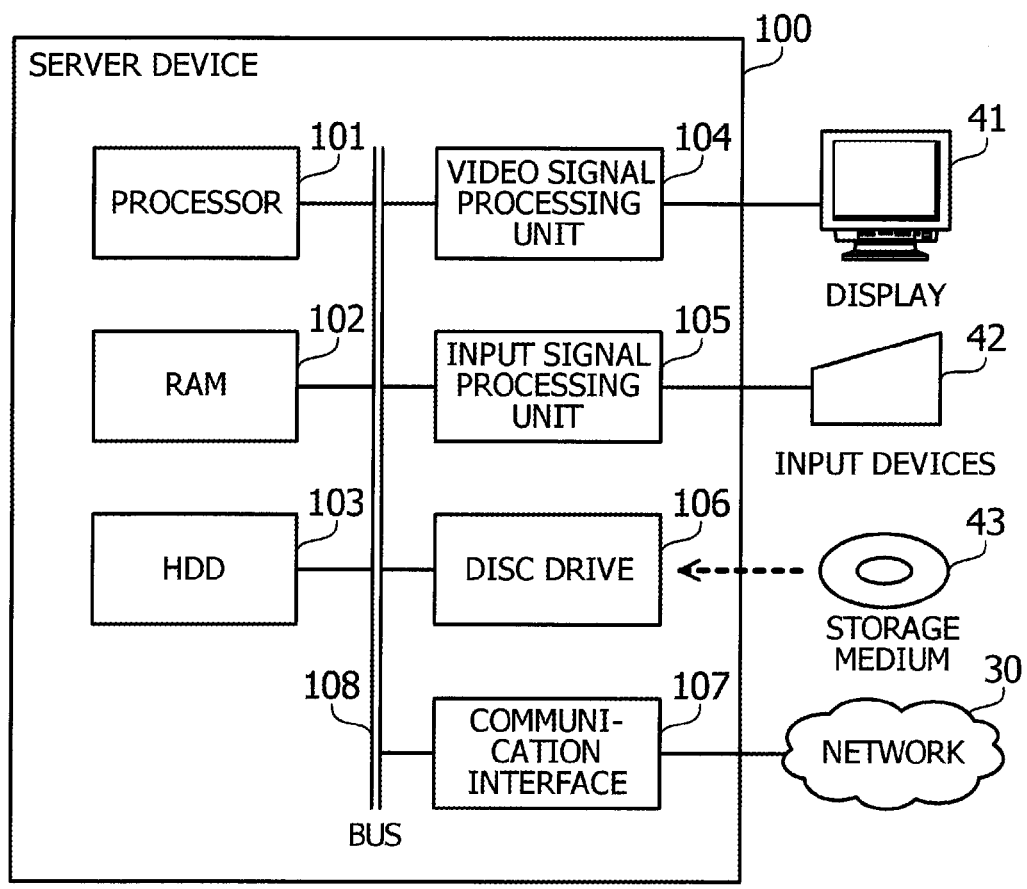
FIG. 3 is a block diagram illustrating an example of hardware configuration of server devices.

FIG. 3 is a block diagram illustrating an example of hardware configuration of server devices. The illustrated server device 100 includes a processor 101, a RAM 102, an HDD 103, a video signal processing unit 104, an input signal processing unit 105, a disc drive 106, and a communication interface 107. These functional units are connected to a bus 108 in the server device 100.

The processor 101 is, for example, a CPU containing arithmetic and logic units and other computational functions to execute programmed instructions. The processor 101 reads at least part of program and data files stored in the HDD 103 and executes programs after loading them on the RAM 102. The processor 101 may have a plurality of processor cores. The server device 100 may have a plurality of such processors. The server device 100 may be configured to perform parallel processing by using those processors or processor cores. It is also noted that the term "processor" refers not only to a single processor, but also to a system of two or more processors, a dedicated circuit such as FPGA and ASIC, a set of two or more such dedicated circuits, a combination of a processor and a dedicated circuit, and any other possible combinations of these devices.

The RAM 102 serves as a temporary memory for storing at least part of programs that the processor 101 executes, as well as various data that the processor 101 needs to execute the programs. The server device 100 may include other type of memory devices than RAM, as well as two or more sets of non-volatile memory devices.

The HDD 103 serves as a non-volatile storage device to store program and data files of the operating system (OS), firmware, applications, and other kind of software. The server device 100 may include a plurality of non-volatile storage devices such as flash memories and solid state drives (SSD) in place of, or together with the HDD 103.

The video signal processing unit 104 produces video images in accordance with commands from the processor 101 and displays them on a screen of a display 41 attached to the server device 100. The display 41 may be, for example, a cathode ray tube (CRT) display or a liquid crystal display.

The input signal processing unit 105 receives input signals from input devices 42 and supplies them to the processor 101. The input devices 42 may be, for example, a keyboard and a pointing device such as mouse and touchscreen.

The disc drive 106 is a device used to read programs and data stored in a storage medium 43. Such storage media 43 may include, for example, magnetic disk media such as flexible disk (FD) and HDD, optical disc media such as compact disc (CD) and digital versatile disc (DVD), and magneto-optical storage media such as magneto-optical disc (MO). The disc drive 106 transfers programs and data read out of a storage medium 43 to, for example, the RAM 102 or HDD 103 according to commands from the processor 101.

The communication interface 107 communicates with other information processing apparatuses (e.g., client device 200) via a network 30 or the like.

Where appropriate, the server device 100 may omit its disc drive 106. The server device 100 may also omit its video signal processing unit 104 or input signal processing unit 105 or both of them when it is always under the control of some other terminal device. The display 41 and input devices 42 may be integrated with the enclosure of the server device 100. While FIG. 3 illustrates only one server device 100, other server devices 100a and 100b, as well as the client device 200, may similarly be implemented with the illustrated hardware platform.

Figure 4:
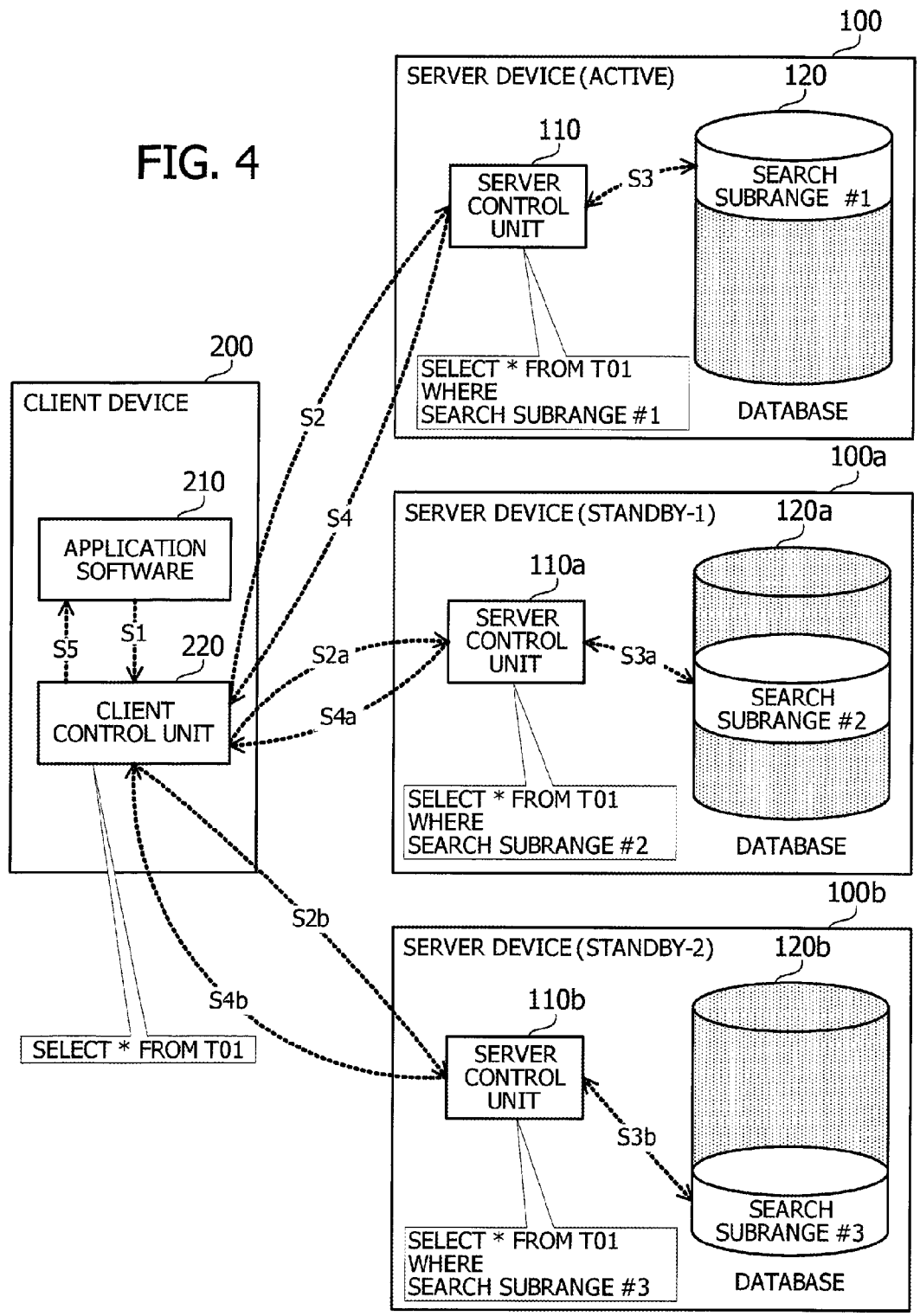
FIG. 4 illustrates an example of how the proposed system executes a search.

FIG. 4 illustrates an example of how the proposed system executes a search. One server device 100 includes a server control unit 110 and database 120. Similarly, another server device 100a includes its server control unit 110a and database 120a, and yet another server device 100b includes its server control unit 110b and database 120b. The first server device 100 is assigned to be the active server while the second and third server devices 100a and 100b are standby-1 and standby-2 servers, respectively.

Three databases 120, 120a, and 120b store a synchronized set of data for use by the client device 200. The data is managed in one or more tables in each of the databases 120, 120a, and 120b. The server control units 110, 110a, and 110b execute access to data in those tables and returns its result to the client device 200. Specifically, the result of a search operation may include information indicating the number of hits, in addition to retrieved data. The result of an update operation includes information indicating whether the update has been successfully finished.

When a search request is received from the client device 200, the server control units 110, 110a, and 110b first calculate their respective search subranges based on the following factors: (a) active/standby status (whether the server is an active server or a standby server), (b) the number of participating server devices (how many server devices are participating in search operations), and (c) search range (what range of data is specified in the search conditions). The search subrange is a part of the specified search range for which a server device is responsible. Preferably the search subranges are exclusive subranges (i.e., there is no overlap). The server control units 110, 110a, and 110b then search the resulting search subranges.

When an update request is received from the client device 200, the server control units 110, 110a, and 110b determine whether to execute the update, depending on the active/standby status of their corresponding server devices 100, 100a, and 100b.

The client device 200 includes application software 210 and a client control unit 220. Application software 210 executes specific information processing by using data records in the databases 120, 120a, and 120b. More specifically, the client control unit 220 requests the server devices 100, 100a, and 100b to retrieve or update data and receives the result of such operation from each server device. The client control unit 220 then merges the received results before sending them to the application software 210.

For example, the above-described system of the second embodiment searches a database as follows. First, the application software 210 requests the client control unit 220 to retrieve some data records from the database (S1). This request causes the client device 200 to broadcast or multicast a database search request to multiple server devices 100, 100a, and 100b at a time. Suppose, for example, that the client device 200 requests data in a table named "T01" (S2, S2a, S2b). Where appropriate, the following description refers to this table as "table T01."

The server control units 110, 110a, and 110b then calculate search subranges based on their assigned active/standby status and the number of participating server devices. For example, the server control units 110, 110a, and 110b respectively obtain search subrange #1, search subrange #2, and search subrange #3, and search their own search subranges to retrieve data (S3, S3a, S3b). The server control units 110, 110a, and 110b send their search results back to the client device 200 (S4, S4a, S4b). The client control unit 220 merges the received results into a single set of data records and passes it to the requesting application software 210 (S5).

Referring now to FIGS. 5 to 8, the following section will describe how search subranges are determined, assuming two different search operations, one using index and the other using no index. The description may refer to the former case as "index search" and the latter case as "non-index search."

The server control unit 110 is designed to support both index search and non-index search for retrieval of data from a table. Index search is used when, for example, the column specified in a search condition has an index. The index is organized in a tree data structure (e.g., B-Tree) as will be described later. Non-index search, on the other hand, is used when the column specified in a search condition has no index.

Figure 5:
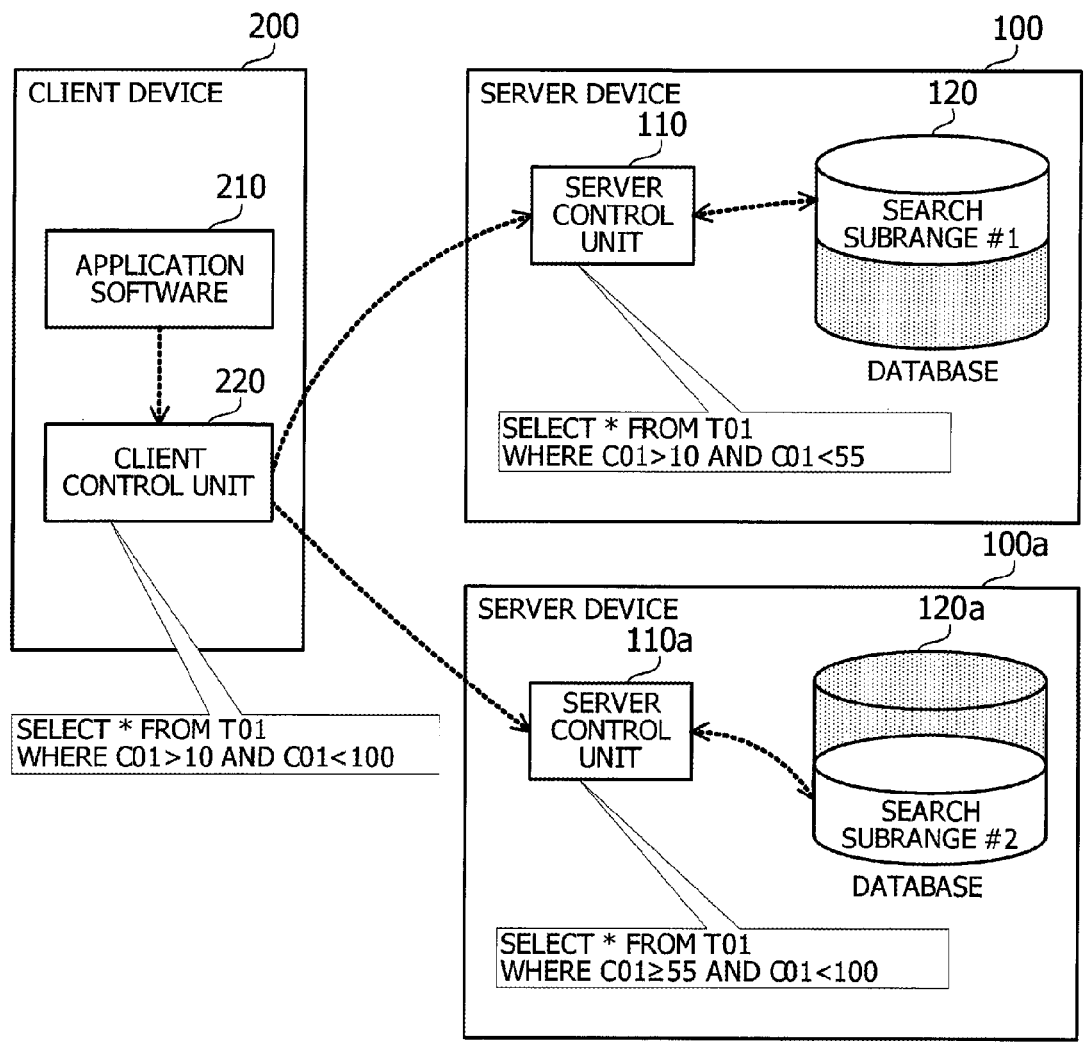
FIG. 5 illustrates an example of how search subranges are calculated for non-index search.

FIG. 5 illustrates an example of how search subranges are calculated for non-index search. The client device 200 specifies search conditions including a specific search range of data. In the case of non-index search, the server control unit 110 calculates its responsible search subrange by dividing the search range by the number of participating servers. In the present example, two server devices 100 and 100a are connected to the client device 200. Suppose now that the client control unit 220 requests retrieval of data from table T01, specifying a search condition of "10<C01<100" to the participating server devices 100 and 100a. C01 is one of the columns of table T01. The search condition means that the server devices 100 and 100a are to retrieve entries of table 101 whose column values in C01 fall in the range above 10 and below 100.

The server control unit 110 then splits this search range into two parts at a midpoint value of 55 between the upper end 100 and lower end 10 of the range. That is, the server control unit 110 determines 10<C01<55 as its own search subrange #1. The other server control unit 110a similarly determines 55≤C01<100 as its search subrange #2.

Figure 6:
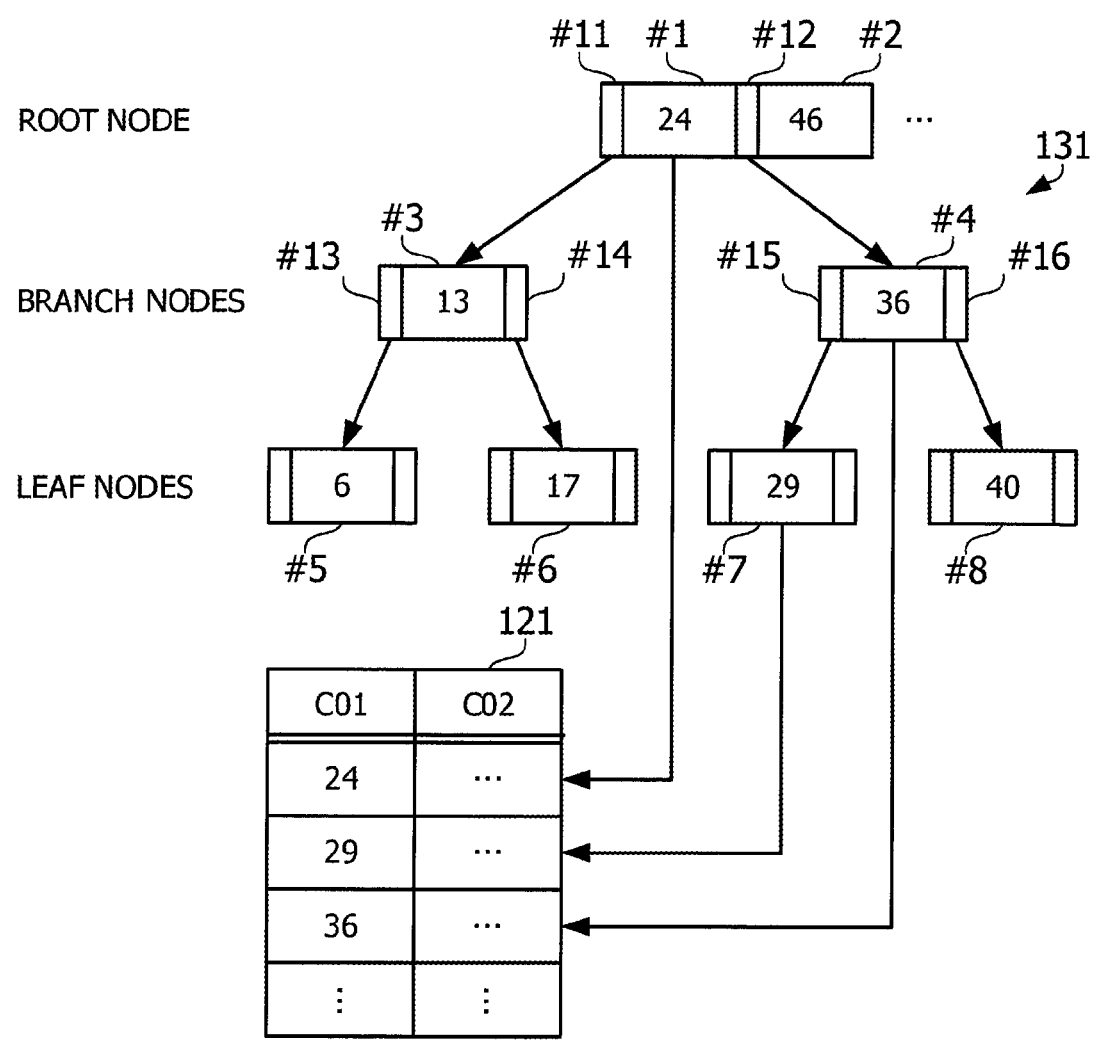
FIG. 6 illustrates an example of an index structure.

FIG. 6 illustrates an example of an index structure. When searching a database table, each server device uses an index corresponding to a column of the table which is specified in a search condition. Seen in the bottom of FIG. 6 is a table 121 that accommodates data records of the database 120 (not depicted). This table 121 has two columns named "C01" and "C02." The following description refers to these columns as "column C01" and "column C02."

Given a particular search condition about column C01 in the table 121, the server device 100 searches the table 121 by using an index 131 that is constructed with values in column C01 as the key values. While the illustrated index 131 is based on a single column, it is possible to use a combination of several columns as index keys.

The index 131 is stored as part of the database 120. The index 131 has been produced as a data structure uniquely corresponding to the set of values stored in column C01 of the table 121. This means that a plurality of synchronized databases will have identical indexes. Since other server devices than the server device 100 have a table synchronized with the table 121, their indexes are identical with the index 131 described below.

The index 131 may be, for example, a B-Tree index, which is based on a data structure known as the B-Tree. Specifically, the illustrated index 131 is formed from a root node containing keys #1 and #2, a branch node containing key #3, another branch node containing key #4, a leaf node containing key #5, another leaf node containing key #6, yet another leaf node containing key #7, and a still another leaf node containing key #8.

The root node is at the top end of a tree structure (which is drawn upside down compared to an actual tree) and has one or more keys and two or more pointers. A pointer in the root node points to a branch node. The root node may also be referred to as the root block. Branch nodes are intermediate nodes located between the root node and leaf nodes. A branch node has one or more keys and two or more pointers. A pointer in a branch node points to another branch node or a leaf node. Branch nodes may also be referred to as branch blocks. Leaf nodes are at bottom ends of the tree structure and has one or more keys and two or more pointers containing a piece of information (e.g., null) indicating one extreme end of the index tree. Leaf nodes may also be referred to as leaf blocks.

Each node has at most k keys and k+1 pointers, which are alternately arranged, with a pointer at the beginning. Referring to the illustrated index 131, the root node includes pointer #11, key #1, pointer #12, and key #2 arranged in that order. Located below the root node are branch nodes containing key #3 and key #4, respectively. The former branch node includes pointer #13, key #3, and pointer #14 arranged in that order. The latter branch node includes pointer #15, key #4, and pointer #16 arranged in that order.

When a node has a plurality of keys, those keys are sorted in ascending order. For example, the root node of the index 131 has two key values, 24 (key #1) and 46 (key #2).

While not fully depicted in FIG. 6, every key has a pointer directed to a database record corresponding to that value. Referring to the example of FIG. 6, key #1 in the root node has a pointer to a record of C01=24. Similarly key #4 has a pointer to a record of C01=36, and key #7 has a pointer to a record of C01=29.

Pointers #11, #12, #13, and #14 point to lower-layer nodes immediately below their respective layers. Let us think of an upper-layer node with a pointer pointing to a key of a lower-layer node. When this upper-node has a preceding key on the left of the pointer, the pointed key in the lower-layer node is greater than the preceding key in the upper node. When the upper-node has a succeeding key on the right of the pointer, the pointed key in the lower-layer node is smaller than the succeeding key in the upper node. See, for example, pointer #11 pointing to a branch node containing key #3. This branch node has a value of 13 for key #3, which is smaller than the value 24 of key #1. As another example, pointer #12 points to a branch node containing key #4. This key #4 has a value of 36, which is larger than the value 24 of preceding key #1 on the left of pointer #12 and smaller than the value 46 of succeeding key #2 on the right of pointer #12.

The above-noted relationships between key values similarly apply to other pointers seen in FIG. 6 as follows: Pointer #13 points to a leaf node containing key #5. This key #5 has a value of 6, which is smaller than the value 13 of key #3. Pointer #14 points to a leaf node containing key #6. This key #6 has a value of 17, which is greater than the value 13 of key #3. Pointer #15 points to a leaf node containing key #7. This key #7 has a value of 29, which is smaller than the value 36 of key #4. Pointer #16 points to a leaf node containing key #8. This key #8 has a value of 40, which is greater than the value 36 of key #4.

As can be seen from the above description, the B-Tree index divides a given range of keys into a plurality of subranges hierarchically organized from one root node to multiple leaf nodes. In other words, a pointer pointing to a node immediately below the current layer represents a specific subrange of keys. Referring to the example of FIG. 6, the root node divides the values in column C01 into subranges, i.e., C01<24, 24, 24<C01<46, and 46. Then one branch node further subdivides its corresponding subrange C01<24 into C01<13, 13, and 13<C01<24, and another branch node subdivides its corresponding subrange 24<C01<46 into 24<C01<36, 36, and 36<C01<46. It is noted that the key values seen in the root node of the index 131 may be used as the boundary values for demarcating search subranges. This choice of boundary values is expected to substantially equalize the load of each server device in searching their respective search subranges. For example, it would be possible to equalize the number of records to be searched by each server device.

Suppose now that a search request specifies a particular value as the search key. The server device executes an index search to handle this request as follows. At the outset, the server device determines whether the root node contains the specified value in its key fields. When the exact value is found in a key, the server device then extracts a record pointed by the pointer associated with the key. When there are no keys matching with the specified value, the server device further investigates the root node structure to seek the leftmost one of the keys whose values are greater than the specified value. When such a key is found, the server device selects a pointer that immediately precedes the found key in the root key structure. When there are no such keys, the server device selects a pointer at the rightmost end of the root node structure.

The server device subsequently turns to a branch node pointed by the selected pointer and makes a similar determination as to whether the specified value is present in a key of that branch node in question. When the specified value is found in a key, the server device then extracts a record pointed by the pointer associated with the key. When there are no keys matching with the specified value, the server device further investigates the branch node structure to seek the leftmost one of the keys whose values are greater than the specified value, just as done with the root node. When such a key is found, the server device selects a pointer that immediately precedes the found key in the branch key structure. When there are no such keys, the server device selects a pointer that is located at the rightmost end of the branch node structure. The selected pointer may points to another branch node or a leaf node in the immediately lower layer. In the former case, the server device extracts a record or selects a pointer in the same way as it has done with the above branch node.

In the case where the selected pointer points to a leaf node, the server device determines whether the specified value is present in a key of that leaf node. When the specified value is found in a key of the leaf node, the server device then extracts a record pointed by the pointer associated with the key. When no such keys are found, the server device terminates the process with, for example, an error code indicating the absence of matching database records.

As a more specific example, suppose now that an index search is performed with a search condition of C01=29. The server device first identifies key #2 in the root node as being the leftmost key whose value is greater than 29. The server device thus selects pointer #12 immediately before the key #2 in the root node structure, meaning that the search range is narrowed down to 24<C01<46. The server device then reaches a branch node pointed by pointer #12, where key #4 has a value that is greater than 29. The server device now selects pointer #15 since it immediately precedes the key #4. This means that the search range is further narrowed down to 24<C01<36. The selected pointer #15 brings the server device to a leaf node whose key #7 has a value is 29. Following the pointer associated with this key #7, the server device finally extracts a record having C01=29.

The index may be updated in accordance with a change in the database. The server device achieves this update by tracing the index tree structure from root node to leaf nodes until it reaches a node that contains a key value to be deleted or a node that is to accommodate a new key value. Suppose, for example, that a record having a column value of C01=29 has been deleted from the database. The server device starts searching with key #1 in the root node, then proceeds to a branch node having key #4, and finally reaches a leaf node having key #7. The server device deletes this key #7. For another example, suppose that a new record with a column value of C01=31 has been inserted to the database, necessitating addition of the key value "31" to the index. The server device starts with key #1 in the root node, then proceeds to a branch node containing key #4, and adds a new key with a value of 31 to the leaf node pointed by pointer #15.

One feature of B-Tree index is that a branch node has at least j/2 pointers where j is the maximum number of pointers that one node is allowed to have. When, for example, one node has at most two pointers, each branch node has at least one pointer. This feature levels off the depth of leaf nodes in the B-Tree hierarchy. The index 131 thus enables retrieval of desired data by repeating as many searching steps as the depth of leaf nodes, which is in the logarithmic order. This nature of the index 131 contributes to a stable speed of data searching.

The index 131 may, however, not be limited to the B-Tree discussed above. For example, the index 131 may also be provided as an index of B*Tree, B+Tree, or other tree structures.

Figure 7:
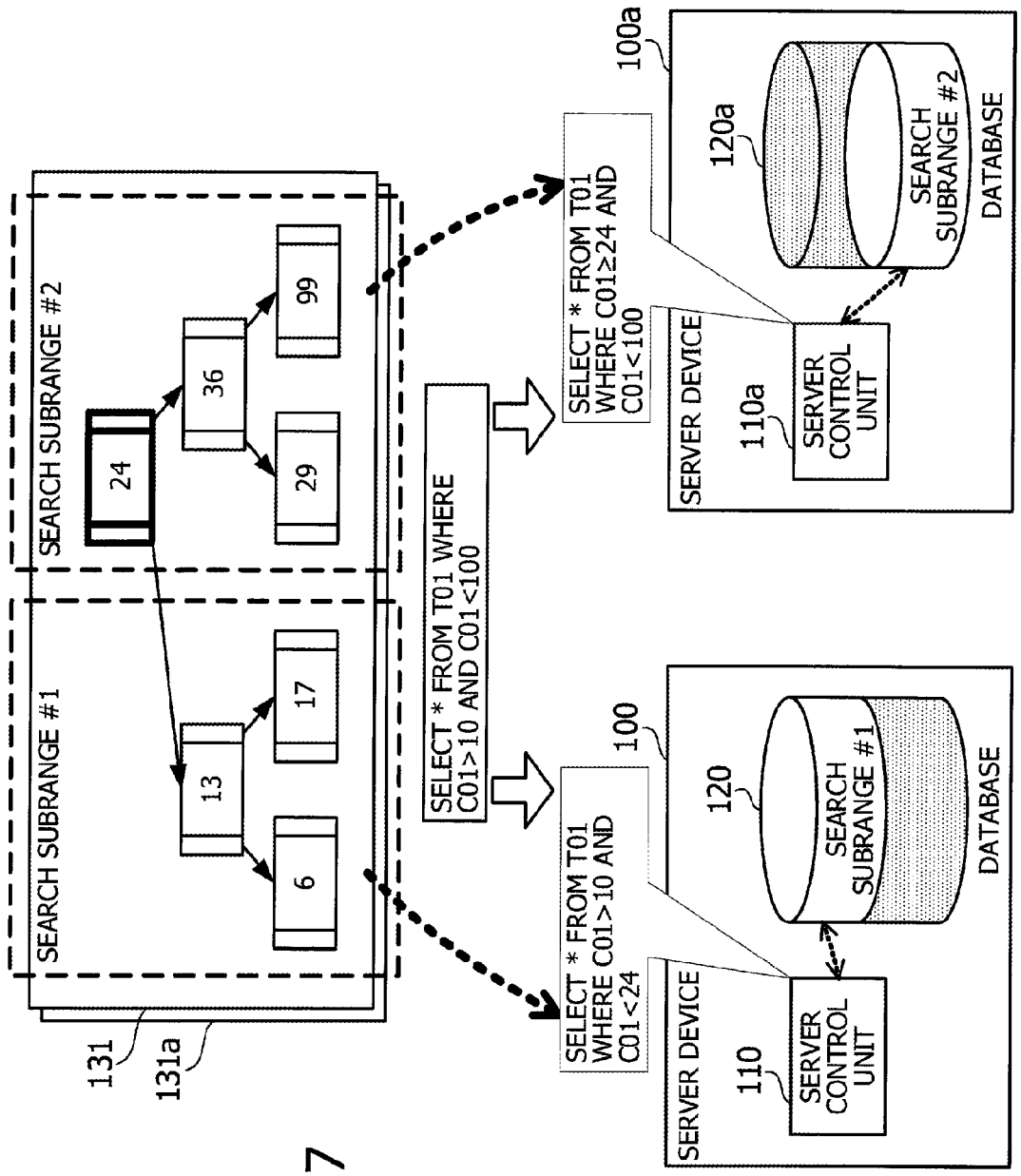
FIG. 7 illustrates an example of how search subranges are calculated for index search.

FIG. 7 illustrates an example of how search subranges are calculated for index search. When two or more server devices participate in search operations, each such server device produces an index that has as many root node keys as one less than the number of participating server devices. This rule does not apply to the case of only one participating server, since producing a root node with no keys does not make sense. In this case, an index for the only server device is produced with one or more keys in its root node. As discussed previously, each server device includes a server control unit, which determines a search subrange in the following way.

The server control unit in each server device calculates a range of data contained in a virtual partition in such a way that the range is demarcated by a key value in the root node that corresponds to the assigned active/standby status of the server device. Here the database is divided into as many sub-datasets as the number of participating server devices. The term "virtual partition" refers to one of those sub-datasets. It is noted that these partitions are "virtual" (not physical) because the server devices actually have the same set of data in their respective local databases as a result of data synchronization. When retrieving some data records from the database, each participating server device searches only one of those virtual partitions. In other words, each server device acts as if there is only a limited portion of the database. The following description may use the term "limit range" to refer to the range of data contained in such a virtual partition. In each server device, the server control unit determines its search subrange as an overlap of a calculated limit range and the search range specified as part of search conditions.

Referring to the example of FIG. 7, there are two server devices 100 and 100a connected to a client device 200 (not illustrated). Both server devices 100 and 100a have their copies of table T01, which are synchronized with each other. The server devices 100 and 100a also store indexes 131 and 131a in their local storage. The root node of each index has a key value of 24. This is the only key value in the root node of the indexes 131 and 131a since the number of participating server devices is two in the example of FIG. 7. That is, the number of key values in the root node is calculated as 2−1=1.

Suppose now that the client control unit 220 requests retrieval of data records from table T01, specifying a range of column values, 10<C01<100, as a search condition. In response to this request to the server devices 100 and 100a, their server control units 110 and 110a calculate two limit ranges by using the above-noted key value. For example, the former server control unit 110 calculates one limit range "C01<24" while the latter server control unit 110a calculates the other limit range "24≤C01." Each server control unit 110 and 110a then determines a search subrange as an overlap of the calculated limit range with the specified search range. For example, one server control unit 110 finds that a range 10<C01<24 is common to the calculated range C01<24 and the specified search range 10<C01<100, and thus selects this common range as its search subrange #1. The other server control unit 110a finds that a range 24≤C01<100 is a common part of the calculated range 24≤C01 and the specified search range 10<C01<100, and thus selects this common range as its search subrange #2.

The above-described example of search range determination has successfully divided a given search range into two search subranges by using a key in the root node of the index. This is, however, not always the case. For example, when the search condition specifies a search range of 30<C01<100, the above-described determination process using the index 131 in FIG. 7 is unable to divide the range into two portions since the limit range C01<24 of one server device 100 does not overlap with the specified search range. In other words, there are no search subranges that can be assigned to the server device 100.

To deal with the above-noted case, the determination process may be modified to select a branch node that has at least one key falling within the specified search range and uses one of those keys in the selected branch node as a boundary value for calculating search subranges. When the index includes two or more branch nodes qualified for this selection, the determination process preferably selects a branch node closest to the root node in terms of the node depth. Since the aforementioned search range 30<C01<100 does not contain the root node key value of 24, the determination process seeks a branch node having at least one key in that range, thus finding and selecting a branch node with a key value of 36. This selected key value demarcates the boundary of search subranges, as in 30<C01<36 and 36≤C01<100.

Generally, as more keys are included in a specified search range, more servers can receive assignment of non-null search subranges. It is, therefore, preferable to select a branch node having many keys that fall within the specified search range when there are three or more participating server devices. It may be appropriate, however, to limit the depth of candidate branch nodes from the root node in the index structure, not to produce too small search subranges.

Figure 8:
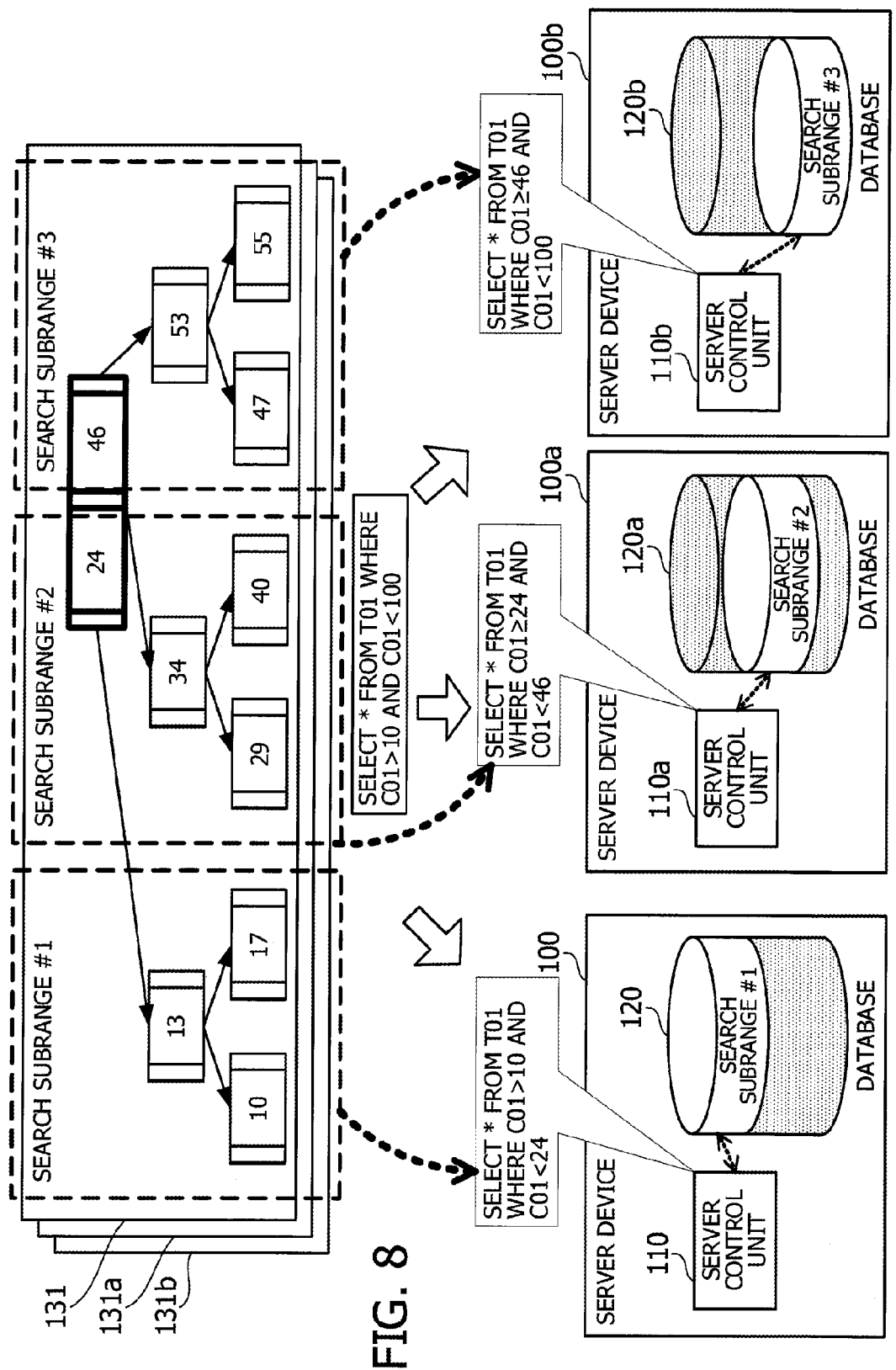
FIG. 8 illustrates another example of how search subranges are calculated for index search.

FIG. 8 illustrates another example of how search subranges are calculated for index search. In this example, a client device 200 (not depicted) is linked to three server devices 100, 100a, and 100b. These server devices 100, 100a, and 100b have their copies of table T01, which are synchronized with each other. They also have indexes 131, 131a, and 131b corresponding to a column of table T01. Specifically, the indexes 131, 131a, and 131b are stored in a local storage device of the server devices 100, 100a, and 100b, respectively. The root node of each index 131, 131a, and 131b has two key values, 24 and 46. This number (2) of key values derives from the number of participating server devices, i.e., 3−1=2.

Suppose now that the client control unit 220 requests retrieval of data records from table T01, specifying a range of 10<C01<100 as a search condition. In response to this request to the server devices 100, 100a, and 100b, their server control units 110, 110a, and 110b calculate three limit ranges by using the two key values noted above. For example, the server control units 110, 110a, and 110b calculate limit ranges of C01<24, 24≤C01<46, and 46≤C01, respectively. Each server control unit 110, 110a, and 110b then determines a search subrange as an overlap of the calculated limit range with the search range specified in the given search condition. For example, one server control unit 110 finds that a range 10<C01<24 is common to the calculated range C01<24 and the specified search range 10<C01<100, and thus selects this common range as its search subrange #1. Another server control unit 110a finds that a range 24≤C01<46 is common to the calculated range 24≤C01<46 and the specified search range 10<C01<100, and thus selects this common range as its search subrange #2. Yet another server control unit 110b finds that a range 46≤C01<100 is common to the calculated range 46≤C01 and the specified search range 10<C01<100, and thus selects this common range as its search subrange #3.

Recall that the search range determination discussed in FIG. 5 for non-index search simply divides a given search range by the number of server devices. The resulting search subranges, however, could lead to a load imbalance among the participating server devices when the data records concentrate in some particular subrange. In contrast, the process described above in FIGS. 6 to 8 enables each server device to use a key value(s) in the root node of B-tree index as the boundary value(s) for demarcating search subranges. The load of searching operation is therefore substantially equalized across the participating server devices.

Figure 9:
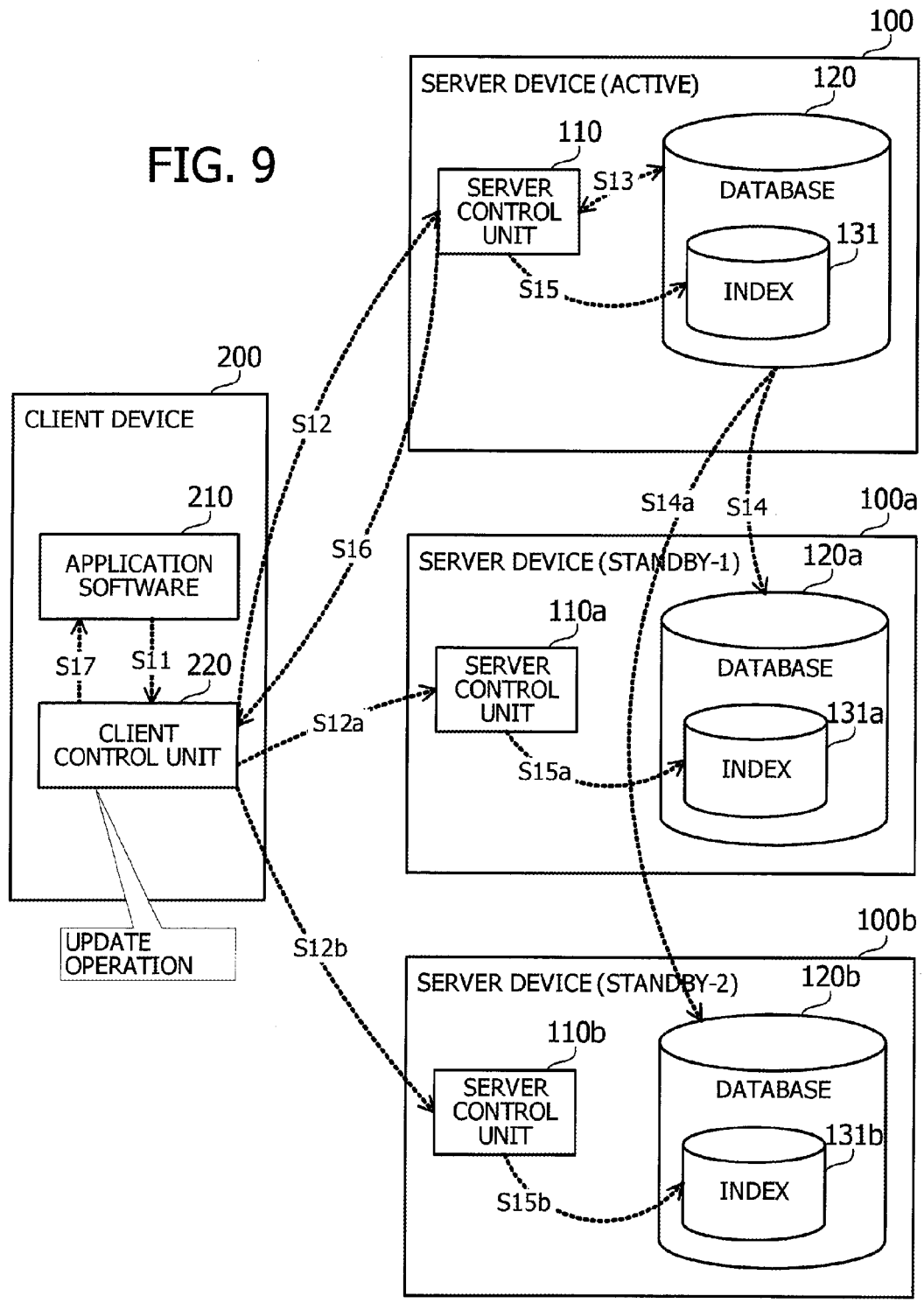
FIG. 9 illustrates an example of how the proposed system updates data records.

FIG. 9 illustrates an example of how the proposed system updates data records. The topmost server device 100 in FIG. 9 has a database 120 with an index 131. Similarly, the next server device 100a has a database 120a with an index 131a, and the bottommost server device 100b has a database 120b with an index 131b. One of these servers acts as an active server device responsive to update requests from the client device 200, while the others (standby server devices) return no response. The following description provides how the system updates data records according to the second embodiment in the order of step numbers seen in FIG. 9.

At the outset, application software 210 requests the client control unit 220 to update some database records (S11). The client control unit 220 broadcasts or multicasts this request to server devices 100, 100a, and 100b at a time (S12, S12a, S12b). In response, each server control unit 110, 110a, and 110b determines whether to execute the requested update operation. More specifically, this determination depends on the active/standby status of each server. That is, the active server device is supposed to execute update operations, while standby server devices are not. In the example of FIG. 9, the topmost server device 100 plays this role of the active server device, thus executing the requested update operation on its database 120 (S13).

The server control unit 110 in the active server device 100 then requests standby server devices to synchronize their databases with the updated database 120. Each standby server device synchronizes its local database with the database 120 accordingly. For example, one standby server device 100a synchronizes its database 120a (S14), and another standby server device 100b also synchronizes its database 120b (S14a).

The server devices then update their respective indexes corresponding to a particular column of the synchronized database tables. More specifically, the topmost server device 100 in FIG. 9 updates its index 131 corresponding to a particular column of the database 120 (S15), the next server device 100a updates its index 131a corresponding to the same particular column of the database 120a (S15a), and the bottommost server device 100b updates its index 131b corresponding to the same particular column of the database 120b (S15b). Subsequently, the server control unit 110 in the active server device 100 returns the result of the above update to the client device 200 (S16). The client control unit 220 then forwards the received result to the application software 210 (S17).

In the above example of FIG. 9, the result of update operations is returned to the requesting client device 200 after synchronization of databases 120, 120a, and 120b. This embodiment may be modified to send the result before the databases 120, 120a, and 120b are synchronized. It is also possible to configure the server devices to update their indexes 131, 131a, 131b after the update result is sent from the server device 100 to the client device 200. The next section will now describe how the system operate when its active server device fails, with reference to FIGS. 10 to 12.

Figure 10:
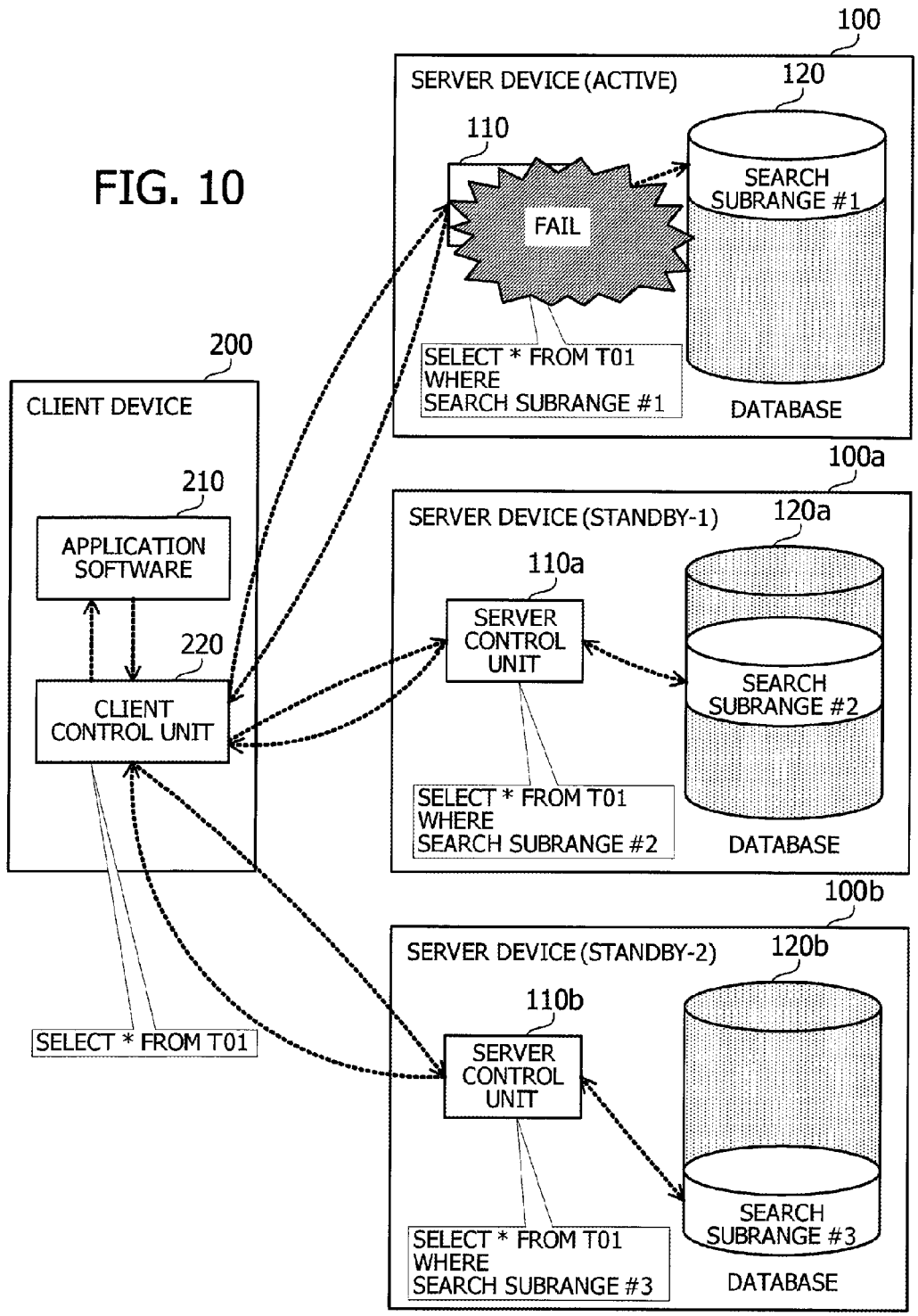
FIG. 10 illustrates an example of how the proposed system continues a search operation in spite of server failure.
Figure 11:
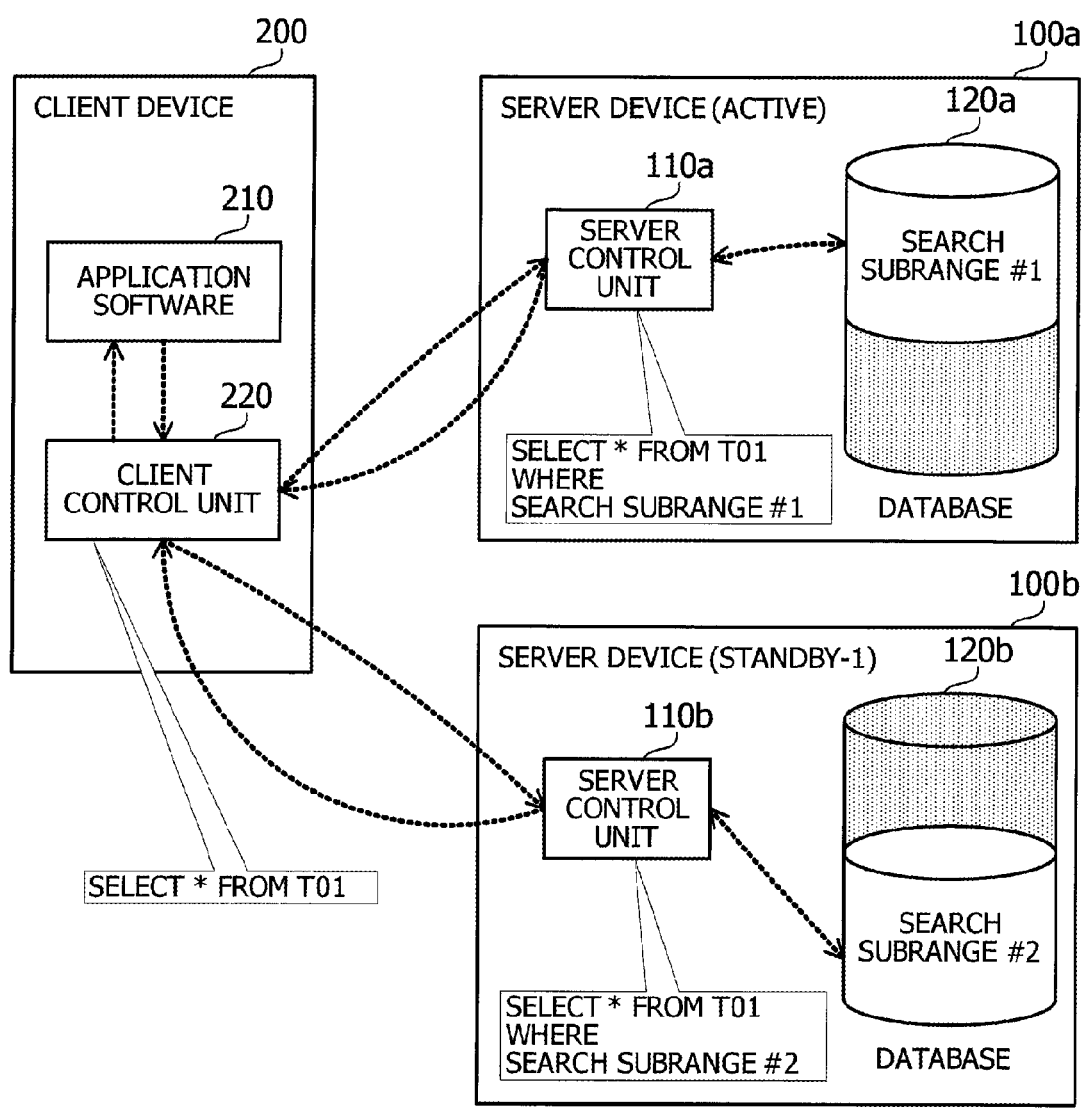
FIG. 11 is a continuing part of the example illustrating how the proposed system continues a search operation in spite of server failure.

FIG. 10 illustrates an example of how the proposed system continues a search operation in spite of server failure, assuming the same system configuration discussed in FIG. 4. The illustrated three server devices 100, 100a, and 100b have determined search subranges #1, #2, and #3 according to their respective active/standby statuses. Suppose now that one server device 100 encounters a failure. FIG. 11 is a continuing part of the example illustrating how the proposed system continues a search operation in spite of server failure. Since the failed server device 100 falls out of the original set of server devices 100, 100a, and 100b, the remaining two server devices 100a and 100b have to handle requests from the client device 200. Accordingly, the status of one server device 100a is changed from "standby-1" to "active," and the status of the other server device 100b is changed from "standby-2" to "standby-1." These two server devices 100a and 100b determine their respective search subranges #1 and #2 according to the new status of each. Because the number of participating server devices has changed, the server devices have a new view of virtual partitions, and hence different limit ranges of data. Even if the same search range is specified by received search requests, the server devices determine different search subranges from those before the server device 100 has failed.

Figure 12:
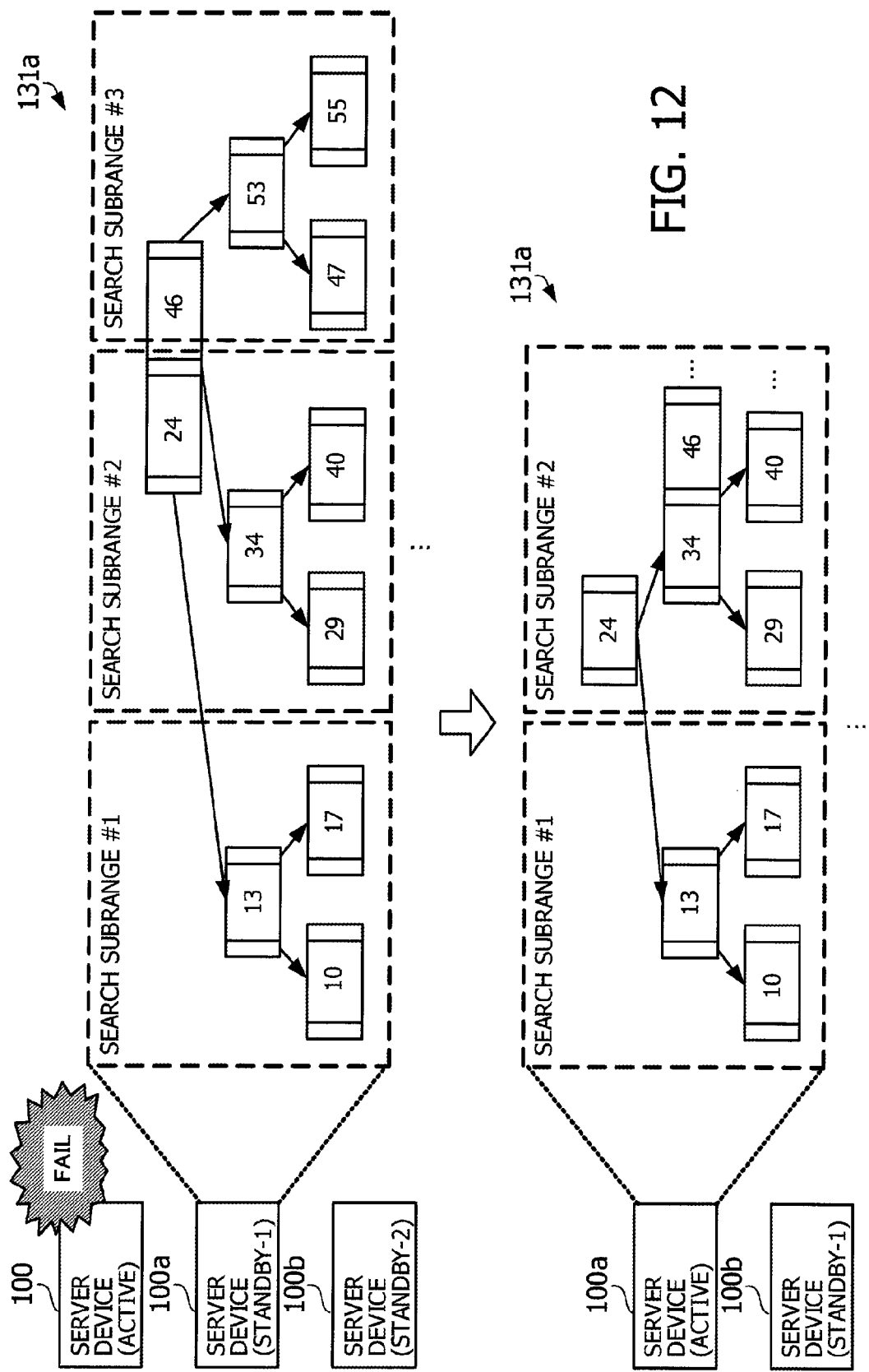
FIG. 12 illustrates an example of how a server device updates its index when another server device is failed.

FIG. 12 illustrates an example of how a server device updates its index when another server device is failed, assuming the same system configuration discussed in FIG. 10. Each server device has two key values in the root node of its index because three server devices are participating in search operations (i.e., 3−1=2). The index 131a of the server device 100a is in the state seen in the upper half of FIG. 12, which also applies to other server devices.

If one server device 100 fails in the above situation, subsequent search requests from the client device 200 are executed by the remaining server devices 100a and 100b. That is, the number of participating servers is reduced to two. Since the number of key values in the root node has also to be reduced from two to one, the server devices 100a and 100b update their respective indexes accordingly. Specifically, the index 131a of the server device 100a is reformed as seen in the lower half of FIG. 12. This change also applies to the other participating server device 100b.

The server device 100 may recover from the failure. In that case, the number of participating server devices changes again from two to three, necessitating update of the index in each server device such that the number of key values in the root node will be increased from one to two. For example, the index 131a of the server device 100a is reformed from the one seen in the lower half of FIG. 12 back to the one seen in the upper half of FIG. 12. The new index structure also applies to other server devices 100 and 100b.

It is noted that such update of index may be implemented as a partial rearrangement of key values in the nodes or as a total reconstruction from the scratch on the basis of data stored in the database.

Figure 13:
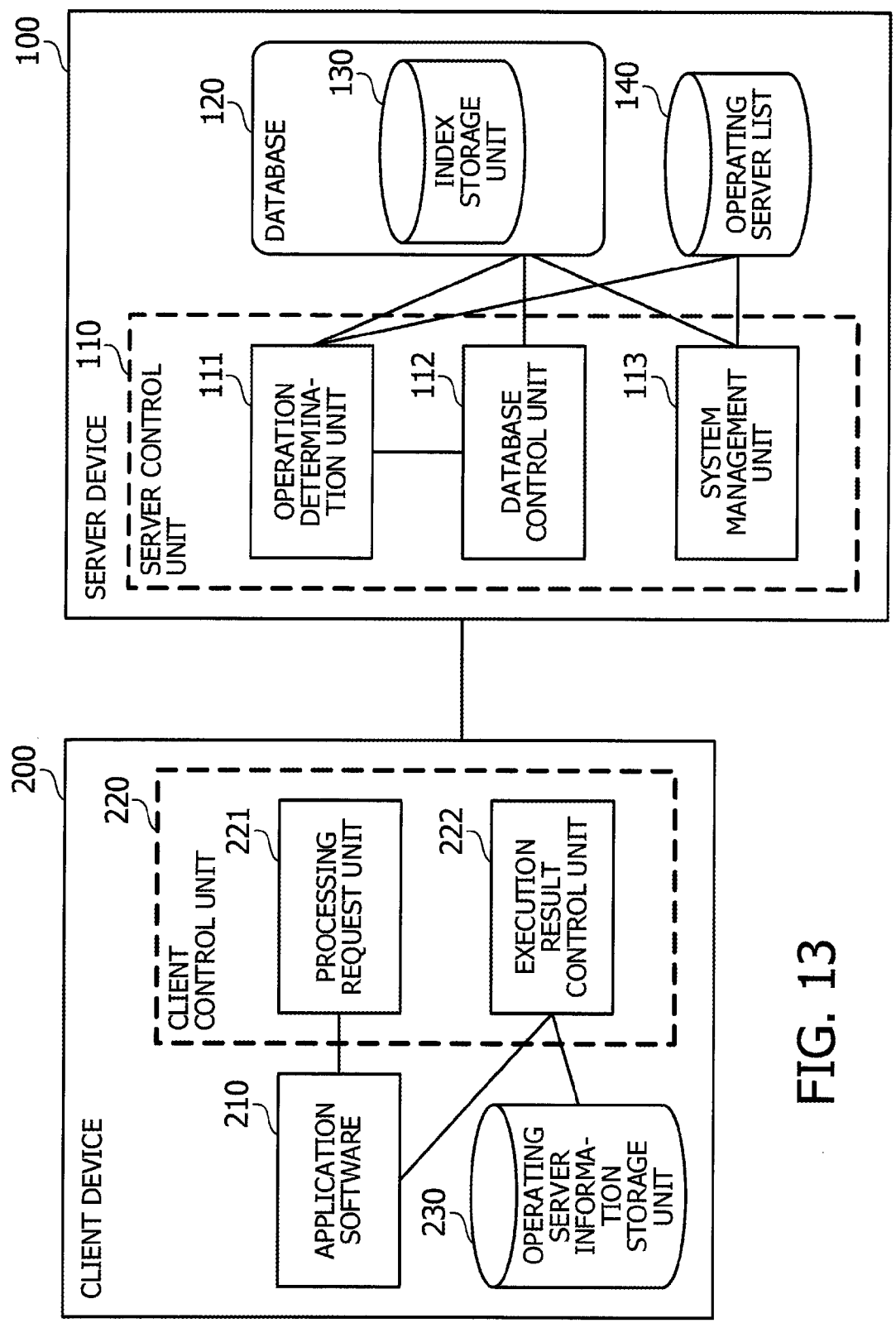
FIG. 13 is a block diagram illustrating an example of functions that the proposed system offers.

FIG. 13 is a block diagram illustrating an example of functions that the proposed system offers. The illustrated client device 200 includes an application software 210, a client control unit 220, and an operating server information storage unit 230. The operating server information storage unit 230 may be implemented as part of the storage space of RAM or HDD in the client device 200. The application software 210 and client control unit 220 may be implemented as program modules that are executed by a processor in the client device 200.

For the application software 210, see the previous description of FIG. 4. The operating server information storage unit 230 stores a responding server list that enumerates server devices that have returned a response to search requests broadcast or multicast to every server device. The operating server information storage unit 230 also stores information indicating the number of participating server devices.

While the client control unit 220 has previously been discussed by way of example in FIG. 4, some more features of the same will be described below. Referring to FIG. 13, the client control unit 220 includes a processing request unit 221 and an execution result control unit 222. The processing request unit 221 receives from the application software 210 a request for update or retrieval of data in one or more tables. Based on this request, the processing request unit 221 produces a processing request message indicating a request for database access (e.g., update or retrieval of data). As will be described later, the processing request message contains several parameters describing an operation on the target database. The processing request unit 221 sends the produced processing request message to a plurality of server devices (e.g., server device 100) at a time.

The execution result control unit 222 receives a processing result message from server devices. This processing result message indicates a result of processing operations performed in response to a processing request message that the processing request unit 221 has transmitted. What is requested by the original processing request message may be an update operation or a search operation. In the case of an update operation, the execution result control unit 222 receives its corresponding processing result message from only one server device (i.e., active server device) and forwards it to the application software 210. In the case of a search operation, the execution result control unit 222 receives its corresponding processing result message from one or more server devices. When there are two or more such messages, the execution result control unit 222 merges the search results into a single set of data and sends it to the application software 210.

Referring now to the right half of FIG. 13, the illustrated server device 100 includes a server control unit 110, a database 120, and an operating server list 140. While the server control unit 110 and database 120 have previously been discussed by way of example in FIG. 4, some more features of the same will be described below. The database 120 and operating server list 140 may be implemented by using the storage space of the RAM 102 and HDD 103 in the server device 100. The server control unit 110 may be implemented as program modules that are executed by the processor 101 in the server device 100. The database 120 is an example of the foregoing databases 11 and 11a of the first embodiment.

The database 120 includes an index storage unit 130. This index storage unit 130 includes database indexes (e.g., index 131) each corresponding to a particular column of a table (e.g., table 121) stored in the database 120.

The operating server list 140 enumerates identifiers of operating server devices in descending order of their operation priority. The operation priority is previously defined and assigned to server devices. Different server devices have different operation priorities. In the system of the second embodiment, one server device with the highest operation priority becomes an active server device, while the rest are standby server devices. When there are two or more standby server devices, they are prioritized in their group as in "standby-1," "standby-2," and so on. When the active server device fails, the standby server device with the highest operation priority is selected as a new active server device. When the standby-1 server device fails, the standby-2 server device takes over the position of standby-1. That is, failure of a server device causes other server devices below the failed device to gain new priorities that are higher by one position.

The server control unit 110 in FIG. 13 includes an operation determination unit 111, a database control unit 112, and a system management unit 113. The operation determination unit 111 receives a processing request message from the client device 200. When the received processing request message is for an update operation, the operation determination unit 111 executes the following things. That is, the operation determination unit 111 determines whether it is operating as part of the active server device. If so, the operation determination unit 111 requests the database control unit 112 to execute the update operation specified in the processing request message. The operation determination unit 111 does not request this when it is operating as part of a standby server device.

When the received processing request message is for a search operation, the operation determination unit 111 determines its responsible search subrange, based on search conditions included in the processing request message, the number of participating server devices, the operation priority of the server device 100, and the root node of a relevant index stored in the index storage unit 130. The operation determination unit 111 then requests the database control unit 112 to execute the search operation within the determined search subrange.

The database control unit 112 updates and searches the database 120 as requested by the operation determination unit 111. The database control unit 112 also receives a synchronization request message from another server device. This synchronization request message contains information that specifies which table to synchronize. The database control unit 112 synchronizes the specified table with a remote table with the same name in the requesting server device. The database control unit 112 then updates indexes (e.g., index 131) each corresponding to a particular column of the synchronized database table.

The system management unit 113 sends a response request message to each server device. This response request message requests the receiving server devices to respond, so that system management unit 113 can check whether they are in a healthy state (i.e., working without failure). When there is no response from a server device, the system management unit 113 determines that the server device in question is failed, thus removing its identifier from the operating server list 140. The system management unit 113 then updates indexes in the index storage unit 130 with the reduced number of participating server devices.

When the server device recovers from failure, the system management unit 113 enters the server device in the operating server list 140. The system management unit 113 then updates indexes in the index storage unit 130 with the increased number of participating server devices. The system management unit 113 may also do the same things for a server device newly deployed in the system.

Referring now to FIGS. 14 to 17, the next section will describe tables and messages used by the system of the second embodiment.

FIG. 14 illustrates an example of processing request messages. The illustrated processing request message 51 is a message that requests the recipient to perform a specific database access operation. This processing request message 51 is broadcast or multicast from a client device 200 to a plurality of server devices.

More specifically, the processing request message 51 includes the following data fields: "Control Data," "Parallelism Flag," "Type," "Table," "Column," and "Condition." These data fields contain information described below. The control data field contains message control parameters for the recipient to handle this processing request message 51, which may include, for example, the number of characters contained in the processing request message 51 and character code of them. The parallelism flag field indicates whether the request allows parallel execution of a search operation with two or more server devices. For example, the parallelism flag field is set to "True" when the server devices 100, 100a, and 100b run in parallel to execute a search operation as seen in FIG. 4. When only one server device (e.g., active server device) is to execute a search operation, the parallelism flag field is set to "False."

The type field specifies what type of operation the client device 200 is requesting to the receiving server device. For example, the type field may be set to "select" to indicate that a search operation is requested. The type field may also be set to "insert" to indicate that insertion of new data is requested. Similarly, it may be set to "delete" to indicate that deletion of existing data is requested, or "update" to indicate that an update of existing data is requested.

The table field specifies a table that is to be searched or updated according to the request. The column field specifies a column of the specified table whose data is to be extracted or rewritten. The condition field specifies a set of conditions that confine the records to be retrieved or updated.

Suppose, for example, that the client device 200 requests retrieval of data in columns C01 and C02 of table T01 out of the records that meet the condition of 10<C01<100. In this case, the processing request message specifies "T01" in the table field, "C01, C02" in the column field, and "C01>10 AND C01<100" in the condition field. For another example, suppose that the client device 200 requests update of data values in column C01 from "20" to "10" in table T01. In this case, the processing request message specifies "T01" in the table field, "C01=10" in the column field, and "C01=20" in the condition field.

The column field may be given a value of "*" when the request specifies data in all columns of records satisfying given search conditions. It is also noted that processing request messages may contain an SQL statement for search or update operations, instead of the type, table, column, and condition fields.

Figure 15:
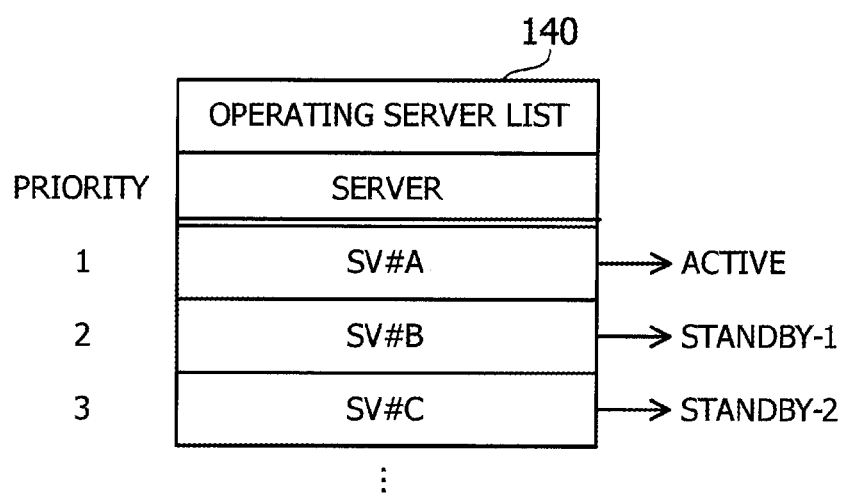
FIG. 15 illustrates an example of an operating server list.

FIG. 15 illustrates an example of an operating server list. This operating server list 140 enumerates the identifiers of server devices currently operating in the system. The operating server list 140 is formed simply from one data field titled "Server." The serve field contains identifiers for identifying server devices. These identifiers are listed downward in descending order of operation priority of server devices. The active/standby status of server devices is determined on the basis of their operation priority. For example, the server device with the highest priority, one, is designated as "active," which is followed by server devices, "standby-1" and "standby-2" and so on, with successively lower priorities. The following description uses the identifiers in the operating server list 140 to distinguish individual server devices, as in "server device SV#A."

For example, the illustrated operating server list 140 includes a series of identifiers "SV#A," "SV#B," and "SV#C" in that order. This means that server device SV#A has the highest operation priority, server device SV#B has the second operation priority, and server device SV#C has the third operation priority. Accordingly, server device SV#A gains the status of "active." The other two server devices SV#B and SV#C are set to "standby 1" and "standby 2," respectively.

While not illustrated in FIG. 15, the operating server list 140 may have more data fields to contain the values of, for example, operation priority and active/standby status. The operating server list 140 may also be modified to contain server names, instead of the identifiers illustrated in FIG. 15, to distinguish server devices from each other. Network address such as Internet Protocol (IP) address may be another option for the same purpose.

FIG. 16 illustrates an example of processing result messages. The illustrated processing result message 52 is a message that indicates a processing result of a processing request message 51 that the client device 200 has sent. Specifically, this processing result message 52 includes the following data fields: "Control Data," "Direct Designation Flag," and "Processing Result." Each data field contains one or more pieces of information described below.

The control data field indicates the number of participating server devices, the operation priority of the source server device of this processing result message 52, and other control parameters (e.g., the number of characters and character code used in the message). The number of participating server devices and operation priority are what the source server device is aware of at the time of transmission of the processing result message 52. For example, the illustrated control data field contains a value of "3:1: DATA A," which indicates that three server devices are participating in search execution, the source server device has the highest operation priority, and other control parameters are given as "DATA A."

The direct designation flag field is used in index search to indicate whether the search operation has been performed with a "direct designation" or "range designation" of records in a database. For example, the direct designation flag field is set to "True" in the case of a direct designation, and "False" in the case of a range designation. The direct designation refers to a search condition designating a particular value in a particular column as in "C01=10." In contrast, the range designation refers to a search condition that designating a range of values in a particular column as in "1<C01<10."

The processing result field provides the result of a processing operation that the source server device of the processing result message 52 has performed. When the performed processing operation is a search, the processing result field contains data retrieved from the column that has been searched. For example, the illustrated processing result field contains two results "(20, aa)" and "(25, bb)," which mean that a record having a value of "20" in column C01 and a value of "aa" in column C02 has been retrieved, as well as with another record having a value of "25" in column C01 and a value of "bb" in column C02. When no data records have been retrieved, the processing result field is empty or contains information indicating that fact (e.g., text "data not found"). When the performed processing operation has ended up with an error, the processing result field contains information indicating the occurrence of error (e.g., text "abnormal end"). Further, when the performed processing operation is an update, the processing result field contains information indicating whether the update has been finished successfully.

Figure 17:
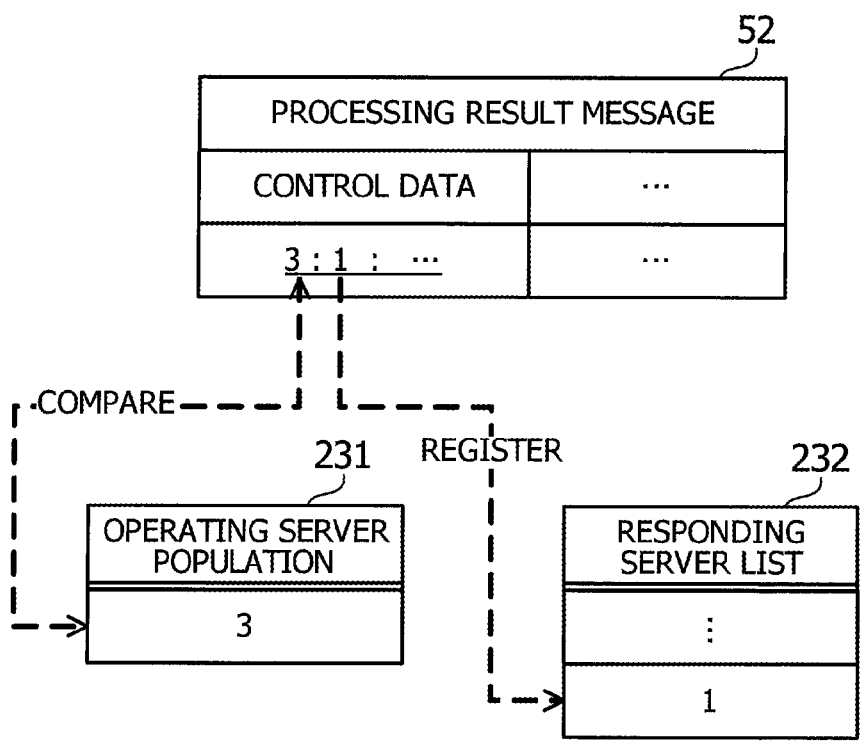
FIG. 17 exemplifies operating server population and a responding server list.

FIG. 17 exemplifies an operating server population and a responding server list. Specifically, the operating server population 231 in FIG. 17 is a parameter representing the number of participating server devices. The responding server list 232 enumerates server devices that have sent processing result messages 52. Both the operating server population 231 and responding server list 232 are stored in the foregoing operating server information storage unit 230.

More specifically, the operating server population 231 is a copy of the number of participating server devices indicated in the control data field of a processing result message 52 that arrives at the client device 200 in the first place. When another processing result message 52 is received, the client device 200 compares the number of participating server devices in its control data field with the operating server population 231. If the two numbers disagree, the client device 200 determines that the number of participating server devices has changed before all server devices respond to the same processing request message 51. This change may have been caused by a failure, or a recovery from failure, in a certain server device. The change in the number of participating server devices causes the client device 200 to discard received processing results and broadcast or multicast a processing request message 51 to multiple server devices.

When a processing result message 52 is received as a response to a processing request message 51 for a search operation, the client device 200 looks into the received processing result message 52 and registers the operation priority of its source server device in the responding server list 232. As previously discussed in FIG. 16, the operation priority of a server device is included in the control data field of a processing result message 52.

Referring now to FIGS. 18 to 23, the following section describes how the system performs a database search operation.

Figure 18:
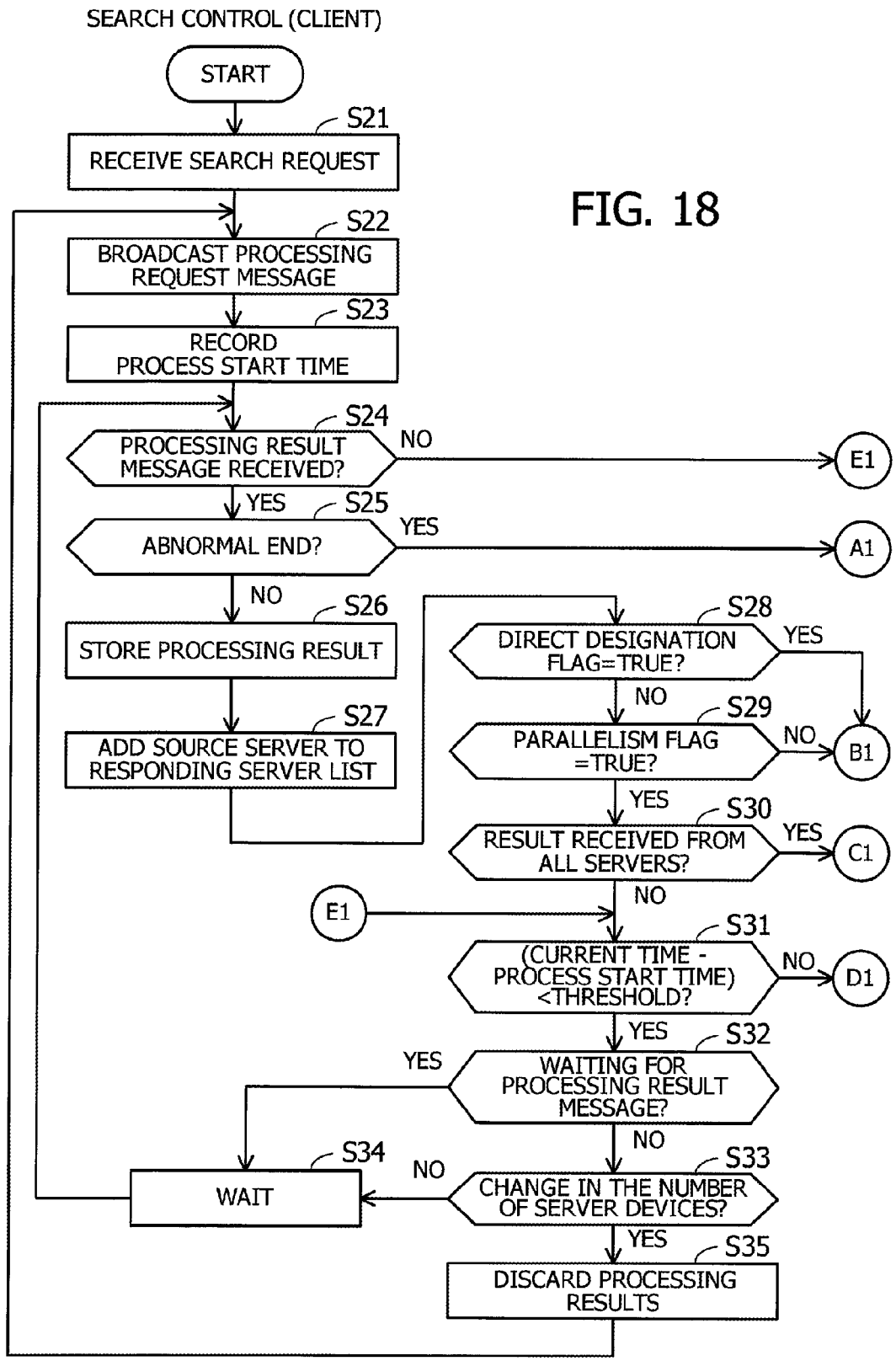
FIG. 18 is a flowchart exemplifying how a client device controls its search operation.

FIG. 18 is a flowchart exemplifying how a client device controls its search operation. Each operation in FIG. 18 is described below in the order of step numbers.

(S21) The processing request unit 221 receives a search request from application software 210. The search request contains information that specifies, for example, which column of which table is to be searched under what search conditions. The application software 210 produces this information. SQL may be used to describe such details of the request.

(S22) Based on the received search request, the processing request unit 221 produces a processing request message 51 by populating its data fields in the following way.

The processing request unit 221 populates the control data field with message control parameters, and gives a value to the parallelism flag to specify whether to make multiple server devices to execute a search operation in parallel. The value for this parallelism flag may be previously stored in the operating server information storage unit 230, or may be specified by the application software 210. The processing request unit 221 sets a value of "select" to the type field and designates a specific table and a specific column of that table in the table field and column field. The processing request unit 221 further populates the condition field with one or more conditional expressions that describe search conditions.

The processing request unit 221 then broadcasts or multicasts the produced processing request message 51 to a plurality of server devices (e.g., server devices 100, 100a, and 100b).

(S23) The execution result control unit 222 records the current time of day as "process start time" in a temporary storage space. Temporary storage space for this purpose may be allocated from, for example, the operating server information storage unit 230.

(S24) The execution result control unit 222 determines whether a processing result message 52 is received from a server device as a response to the processing request message 51 transmitted at step S22. When a processing result message 52 is received, the process advances to step S25. Otherwise, the process skips to step S31.

(S25) The execution result control unit 222 determines whether the received processing result message indicates an abnormal end of the operation. More specifically, this test is made by, for example, checking whether its processing result field contains a value of "abnormal end." When the processing result message 52 indicates an abnormal end, the process proceeds to step S36. Otherwise, the process advances to step S26.

(S26) The received processing result message 52 contains retrieved data in its search result field. The execution result control unit 222 extracts this data and stores it in a temporary storage space (e.g., RAM) of the client device 200.

(S27) When the received processing result message 52 is the first response to the processing request message 51, the execution result control unit 222 extracts the number of server devices indicated in the processing result message 52 and registers it as an operating server population 231. This operating server population 231 means the number of participating server devices that the source server device of the first-received processing result message 52 recognized at the moment of transmission of the same. The control data field of the received processing result message 52 contains a value indicating operation priority of the source server device. The execution result control unit 222 registers this operation priority in the responding server list 232.

(S28) The execution result control unit 222 determines whether the processing result message 52 has a value of "True" in its direct designation flag field. When it has, the process proceeds to step S39. When the direct designation flag is "False," the process advances to step S29.

(S29) The execution result control unit 222 determines whether the processing request message 51 transmitted at step S22 has a value of "True" in its parallelism flag field. When it has, the process advances to step S30. When the parallelism flag is "False," the process proceeds to step S39.

(S30) The execution result control unit 222 determines whether all participating server devices have returned a processing result message 52. This determination is made by, for example, checking whether the number of server devices registered in the responding server list 232 coincides with the operating server population 231. When it is found that all server devices have responded, the process proceeds to step S38. When there is at least one server device that has not returned a processing result message 52, the process advances to step S31.

(S31) The execution result control unit 222 determines whether the difference between the process start time recorded at step S23 and the current time is smaller than a threshold. This difference represents how much time has passed since the transmission of the processing request message 51. The threshold may be stored in, for example, RAM or other storage space in the client device 200. When the time difference is smaller than the threshold, the process advances to step S32. When the time difference is greater than or equal to the threshold, the process proceeds to step S37.

(S32) The execution result control unit 222 determines whether it is waiting for a processing result message 52. This determination depends on the result of reception of a processing result message 52 at step S24. When the execution result control unit 222 is waiting for a processing result message 52 (i.e., no processing result message 52 at step S24), the process branches to step S34. When the execution result control unit 222 is not waiting for a processing result message 52 (i.e., a processing result message 52 has been received at step S24), the process advances to step S33.

(S33) The execution result control unit 222 determines whether the number of participating server devices has changed during a parallel search operation initiated by the processing request message 51.

The number of participating server devices may change as a result of failure in server devices, recovery of server devices from failure, deployment of new server devices, and the like. The execution result control unit 222 detects such changes when the number of server devices indicated in a recently received processing result message 52 disagrees with the operating server population 231 (see FIG. 17). This disagreement means that the number of recognized server devices has changed during the period between transmission of the first processing result message 52 and transmission of the latest processing result message 52. As a possible variation, the execution result control unit 222 may be configured to find a change in the number of server devices when a command indicating recovery of a particular server device is received from an administrator who manages the system of the second embodiment.

Referring back to step S33 of FIG. 18, the process advances to step S35 when there is a change in the number of participating server devices. When there is no change in the number of participating server devices, the process proceeds to step S34.

(S34) The execution result control unit 222 waits for a certain amount of time (e.g., 10 ms or 100 ms). This wait time may be specified by the user of the proposed system, or may be previously given in a storage space of HDD or the like (e.g., configuration file) in the client device 200. The process then goes back to step S24 for reception of another processing result message 52.

(S35) The execution result control unit 222 clears the received data that has been stored since step S26. The execution result control unit 222 also clears the entire data registered in the operating server population 231 and responding server list 232, and then goes back to step S22 to retransmit a processing request message 51. It is noted that the execution result control unit 222 may receive some belated processing result messages 52 responding to the previous processing request message 51 even after the retransmission of a new processing request message 51. The execution result control unit 222 disregards such processing result messages 52 corresponding the old request.

Figure 19:
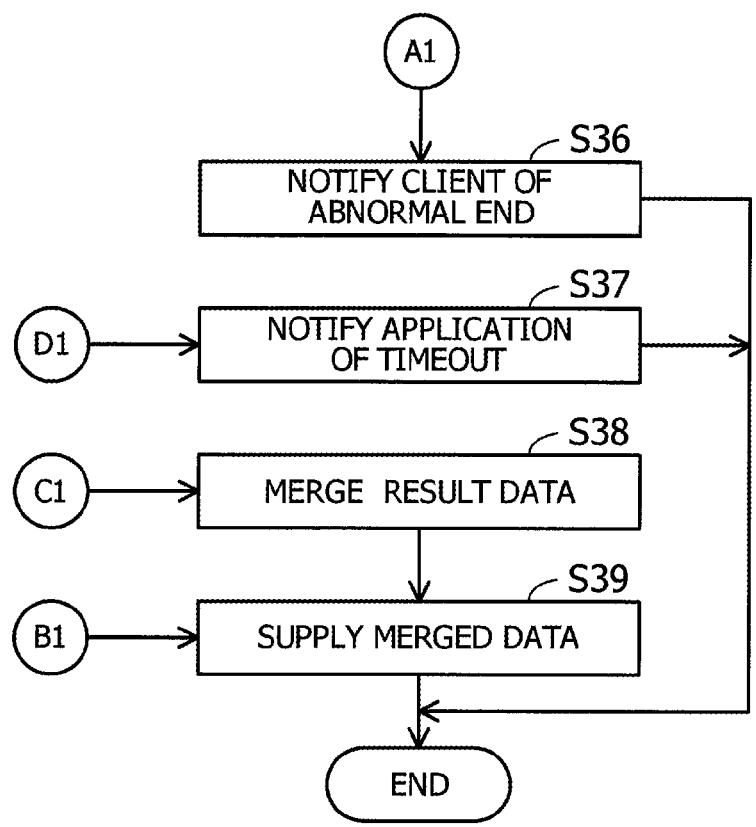
FIG. 19 is a continuing part of the flowchart exemplifying how a client device controls its search operation.

FIG. 19 is a continuing part of the flowchart exemplifying how a client device controls its search operation. Each operation in FIG. 19 is described below in the order of step numbers.

(S36) The execution result control unit 222 notifies the client control unit 220 that the requested search operation has terminated abnormally. The execution result control unit 222 thereafter disregards belated processing result messages 52 (if any) corresponding to the processing request message

51. The execution result control unit 222 also clears received data that has been stored since step S26, as well as the current content of the operating server population 231 and responding server list 232. The application software 210 handles the abnormal end of the search operation, and the execution result control unit 222 exits from this client-side process of search control.

(S37) The execution result control unit 222 notifies the application software 210 of timeout of the requested search operation. The execution result control unit 222 thereafter disregards belated processing result messages 52 (if any) corresponding to the processing request message 51. The execution result control unit 222 also clears received data that has been stored since step S26, as well as the current content of the operating server population 231 and responding server list 232. The application software 210 handles the timeout, and the execution result control unit 222 exits from this client-side process of search control.

(S38) The execution result control unit 222 merges the data that were received from server devices and has been stored since step S26. For example, each set of received data is in the form of a list of records. The execution result control unit 222 concatenates those lists of records into a single list of records.

(S39) The execution result control unit 222 supplies the merged data to the application software 210, and clears the current content of the operating server population 231 and responding server list 232. The application software 210 executes specific processing operations by using the supplied data.

Figure 20:
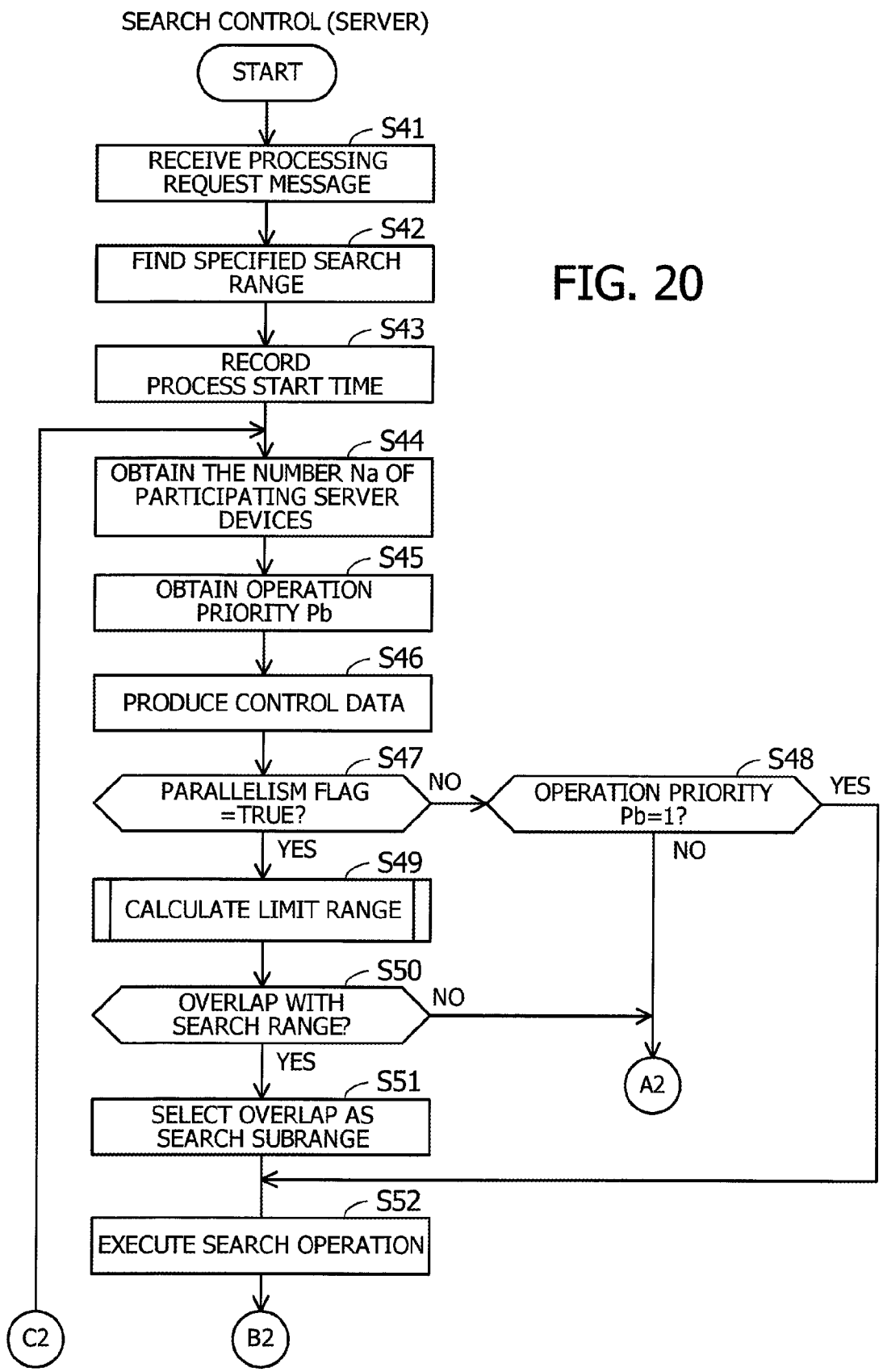
FIG. 20 is a flowchart exemplifying how a server device controls its search operation.

FIG. 20 is a flowchart exemplifying how a server device controls its search operation. The following description of FIG. 20 assumes that the foregoing server device 100 executes the steps illustrated therein, and this applies also to FIGS. 21 to 23. It is further assumed that the processing request message 51 contains a parallelism flag of "False" in the case of a non-index search request with a direct designation of search conditions. Each operation in FIG. 20 is described below in the order of step numbers.

(S41) The operation determination unit 111 receives a processing request message 51 from the client device 200 and finds that the received processing request message 51 contains a value of "select" in its type field.

(S42) The operation determination unit 111 looks into the condition field of the processing request message 51 and finds a search range of data that the client device 200 specifies as part of search conditions.

(S43) The operation determination unit 111 checks the present time and records it as process start time in, for example, the RAM 102 of the server device 100.

(S44) The operation determination unit 111 obtains the number Na of participating server devices (i.e., server devices participating in search operations). This number Na may be obtained by, for example, counting server devices registered in the operating server list 140.

(S45) The operation determination unit 111 obtains operation priority Pb of the server device 100. This operation priority Pb may be obtained by, for example, searching the operating server list 140 of FIG. 15 for a record of the server device 100 in question.

(S46) Based on the number Na of participating server devices and the operation priority Pb, the operation determination unit 111 produces control data for use in a processing result message 52 to be transmitted later. This step may, however, be executed immediately before transmission of a processing result message 52.

(S47) The operation determination unit 111 determines whether the received processing request message 51 contains a value of "True" in its parallelism flag field. When it does, the process advances to step S49. When the parallelism flag is "False," the process proceeds to step S48.

(S48) The operation determination unit 111 determines whether the operation priority Pb is one. When the operation priority Pb is one (i.e., the server device 100 is an active server device), the operation determination unit 111 determines that the requested search operation is to be performed by the server device 100 alone, and thus advances the process to step S52. When the operation priority Pb is not one (i.e., the server device 100 is a standby server device), the operation determination unit 111 determines that the search operation is to be performed by some other single device, and thus advances the process to step S65.

(S49) The operation determination unit 111 calculates a limit range for a particular column that the client device 200 has specified in a search condition. This calculation is based on the index stored in the index storage unit 130, the search range found at step S42, the number Na of participating server devices, and the operation priority Pb. More details will be discussed later in FIG. 22.

(S50) The operation determination unit 111 determines whether the calculated limit range overlaps with the search range of step S42. When an overlap is found, the process advances to step S51. When no overlap is found, the process branches to step S65.

(S51) Now that there is an overlap between the limit range and search range, the operation determination unit 111 selects the overlap as a search subrange in the way discussed previously in FIGS. 7 to 8.

It is noted that when no index is available, the actual calculation of limit ranges is to simply divide the specified search range by the number of server devices as will be described in FIG. 23. This means that every resulting limit range always overlaps with the search range, and the operation determination unit 111 is thus allowed to skip the overlap determination of step S50 in the case of non-index search. It is also noted that when the server device 100 has neither the highest operation priority nor the lowest one, its limit range calculated in the process of FIG. 23 can be used as-is as the search subrange for the server device 100. In that case, the operation determination unit 111 may skip the operation of step S51.

(S52) The database control unit 112 executes a search operation. More specifically, the database control unit 112 searches the database 120, not in the entire search range, but only in its own search subrange determined at step S51 when the parallel execution is specified (YES at step S47). Alternatively, when the server device 100 is the only participating server (YES at step S48), the database control unit 112 searches the database 120 in accordance with the processing request message 51 received from the client device 200. More specifically, the database control unit 112 refers to the table field and column field of the processing request message 51 to determine which table to search and from which column to extract data. The process then proceeds to step S61.

Figure 21:
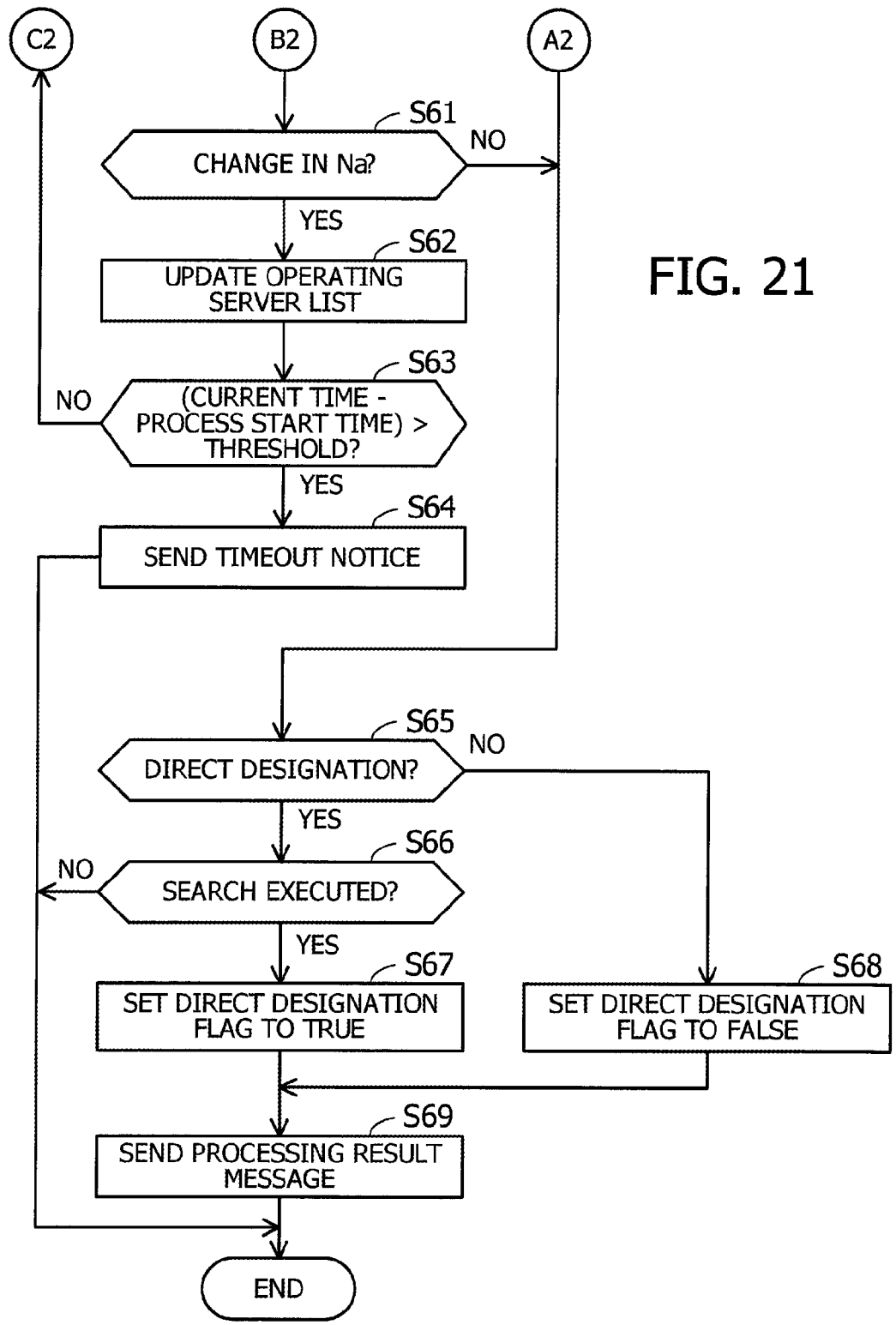
FIG. 21 is a continuing part of the flowchart exemplifying how a server device controls its search operation.

FIG. 21 is a continuing part of the flowchart exemplifying how a server device controls its search operation. Each operation in FIG. 21 is described below in the order of step numbers.

(S61) The system management unit 113 determines whether the number Na of participating server devices has changed. Here the number Na of participating server devices may change as a result of failure in server devices, recovery of server devices from failure, deployment of new server devices, and the like.

The system management unit 113 detects a server failure by sending a response request message to server devices at regular intervals and checking their responses to the message. For this purpose, the address of each destination server device is stored in a storage space of, for example, the HDD 103 of the server device 100. When there is no response from a particular server device, the system management unit 113 determines that the server device is failed.

The system management unit 113 detects recovery of a server device from failure when a command indicating such recovery is received from an administrator of the system. This command contains the identifier of a specific server device that has recovered from failure. As another possible detection, the system management unit 113 may be configured to send response request messages to a failed server device as well, and detect its recovery when there is a response from that server device.

When there is no change in the number of participating server devices, the process proceeds to step S65. When a change is detected in the number of participating server devices, the process advances to step S62.

(S62) The system management unit 113 updates the operating server list 140. For example, the system management unit 113 removes an existing entry of a server device from the operating server list 140 when the server device is found to be failed at step S61. The system management unit 113 registers a server device in the operating server list 140 upon receipt of a recovery-indicating command at step S61, by extracting an identifier indicating the server device in the received command and appending it to the tail end of the operating server list 140.

(S63) The database control unit 112 determines whether the difference between the process start time recorded at step S43 of FIG. 20 and the current time is greater than a threshold. This difference represents how much time has passed since the receipt of the processing request message 51. When the time difference is greater than the threshold, the process advances to step S64. When the time difference is smaller than or equal to the threshold, the process goes back to step S44. It is noted that the threshold used in server devices may be different from the one used in client devices at step S31 of FIG. 18. Preferably, the server-side threshold is smaller than the client-side threshold, so that the server device 100 detects a timeout earlier than the client device 200.

(S64) The database control unit 112 sends a timeout notice to the client device 200 and terminates this search control process in the server device 100.

(S65) The database control unit 112 determines whether the search request includes a direct designation of data. When it does, the process advances to step S66. When the search requests includes a search condition specifying a range of data, the process advances to step S68.

(S66) The database control unit 112 determines whether a search operation has been executed at step S52 of FIG. 20. When a search operation has been executed, the process advances to step S67. When no search operations have been executed at step S67, the database control unit 112 terminates this search control process in the server device 100 without responding to the client device 200 (i.e., without sending a processing result message 52 to the client device 200).

(S67) The database control unit 112 assigns a value of "True" to the direct designation flag field of the processing result message 52. The process then proceeds to step S69.

(S68) The database control unit 112 assigns a value of "False" to the direct designation flag field of the processing result message 52.

(S69) The database control unit 112 populates the control data field of the processing result message 52 with the control data produced at step S46 of FIG. 20, as well as the processing result field with a dataset retrieved as a result of the search operation executed at step S52. The dataset is a null set when no matching record has been found for the specified search conditions or partial search conditions. In that case, the processing result field of the processing result message 52 is left empty or populated with information indicating that fact that no data has been retrieved. The database control unit 112 then sends the processing result message 52 to the client device 200.

Figure 22:
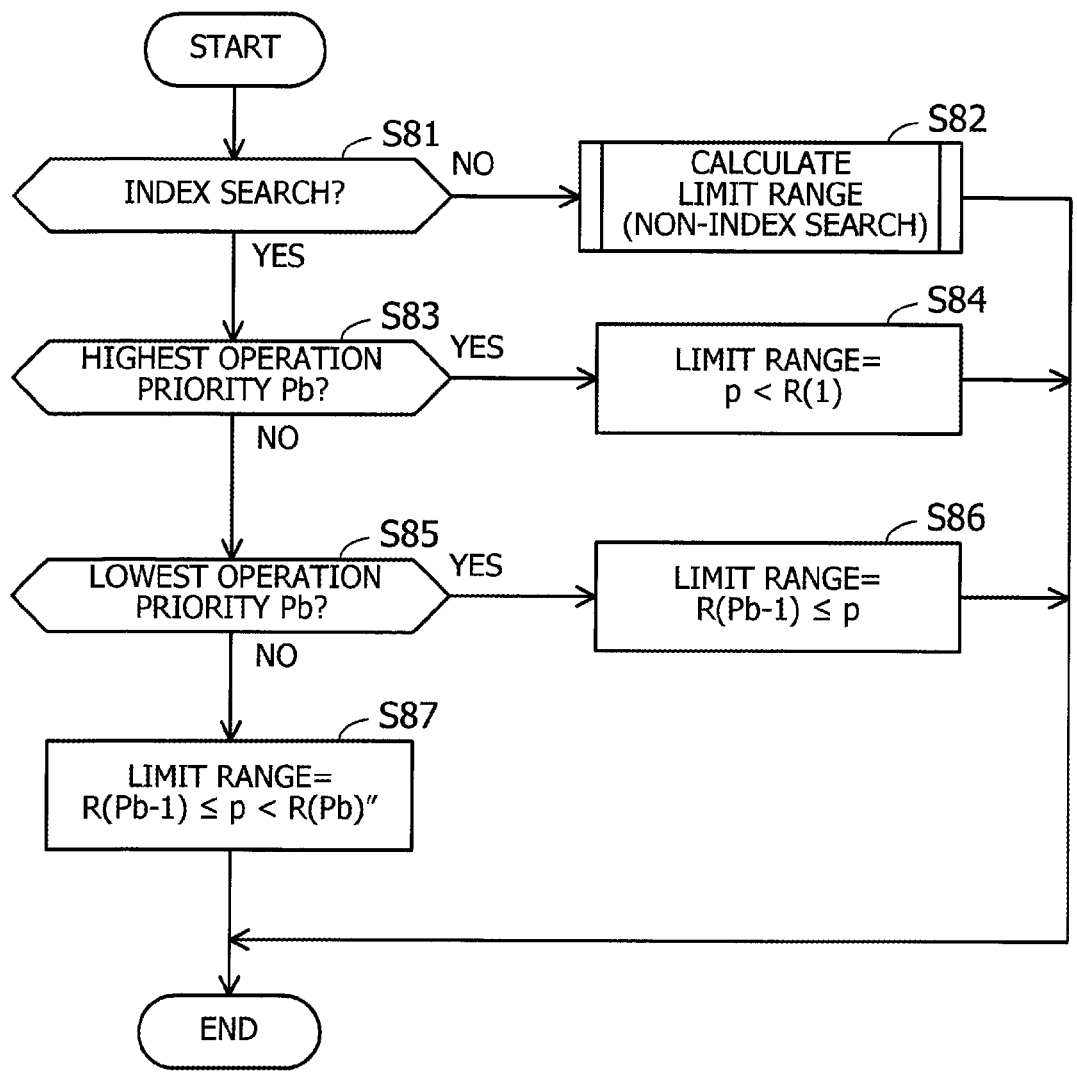
FIG. 22 is a flowchart exemplifying how limit ranges are calculated.

FIG. 22 is a flowchart exemplifying how limit ranges are calculated. The illustrated process is called at the foregoing step S49. Each operation in FIG. 22 is described below in the order of step numbers.

(S81) The operation determination unit 111 determines whether to use an index in search operations. That is, the received processing request message 51 specifies a search range of data in a specific column, and the operation determination unit 111 checks the presence of an index for the specified column. When such an index 131 is available for index search, the process advances to step S83. When no such index is available, a non-index search is chosen, and accordingly, the process advances to step S82.

(S82) Based on the search range, the number Na of participating server devices, and operation priority Pb found at step S42, the operation determination unit 111 calculates a limit range for column values without using index. More specifically, the operation determination unit 111 divides the specified search range by the number Na of participating server devices. Details will be discussed later in FIG. 23.

(S83) The operation determination unit 111 determines whether the operation priority Pb has a value of one, which means the highest priority. When the operation priority Pb is one (i.e., the server device 100 is an active server device), the process advances to step S84. When the operation priority Pb is not one (i.e., the server device 100 is a standby server device), the process advances to step S85.

(S84) The operation determination unit 111 calculates its limit range to be p<R(1) and exits from this process of limit range calculation. Here, p is a variable representing the value of a column specified as a search condition in the processing request message 51, and R(q) represents the q-th key value in the root node when viewed from left to right. For example, R(1) refers to the first (leftmost) root-node key value. This notation also applies to the rest of this description.

(S85) The operation determination unit 111 determines whether the operation priority Pb has the largest value. More specifically, the operation determination unit 111 determines whether the operation priority Pb coincides with the number Na of participating server devices. The largest value of operation priority means that the server device 100 is the lowest of all the participating server devices, in which case the process advances to step S86. When the operation priority value is not the largest, the process advances to step S87.

(S86) The operation determination unit 111 calculates its limit range to be R(Pb−1)≤p and exits from the process of limit range calculation.

(S87) The operation determination unit 111 calculates its relevant limit range to be $R(Pb-1) \leq p < R(Pb)$.

Figure 23:
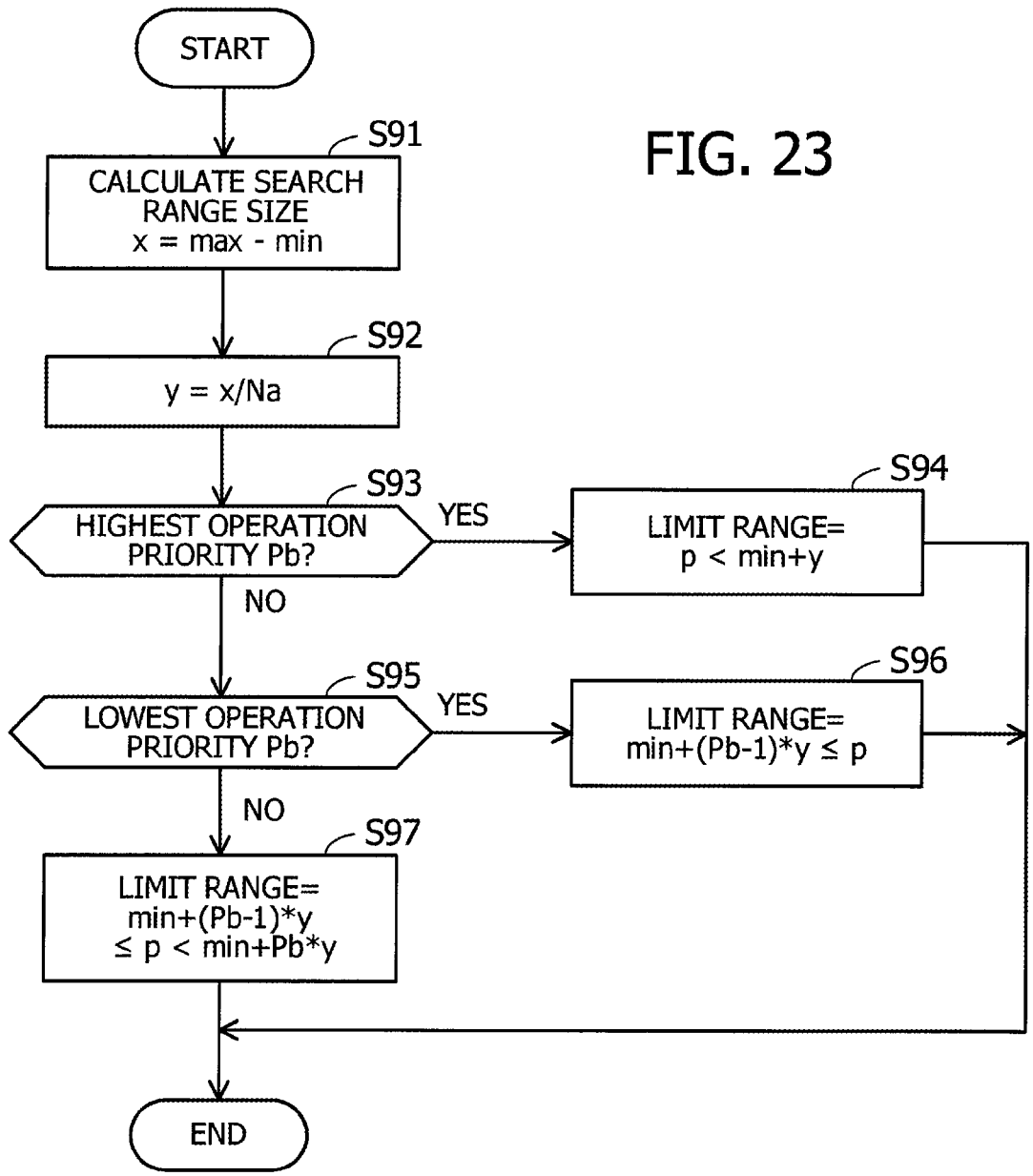
FIG. 23 is a flowchart exemplifying how limit ranges are calculated for non-index search.

FIG. 23 is a flowchart exemplifying how limit ranges are calculated for non-index search. The illustrated process is called at the foregoing step S82. Each operation in FIG. 23 is described below in the order of step numbers.

(S91) The operation determination unit 111 checks the search range found at step S42 of the FIG. 20 to figure out its upper bound (max) and lower bound (min) and their difference (x).

(S92) The operation determination unit 111 calculates a quotient y of the difference x over the number Na of participating server devices.

(S93) The operation determination unit 111 determines whether the operation priority Pb has a value of one. When the operation priority Pb is one (i.e., the server device 100 is an active server device), the process advances to step S94. When the operation priority Pb is not one (i.e., the server device 100 is a standby server device), the process advances to step S95.

(S94) The operation determination unit 111 calculates its limit range to be $p < min+Pb*y$, which is equivalent to $p < min+y$ since Pb=1, and exits from this process of limit range calculation.

(S95) The operation determination unit 111 determines whether the operation priority Pb has the largest value. The largest value of operation priority means that the server device 100 is the lowest of all the participating server devices. When this is the case, the process proceeds to step S96. Otherwise, the process advances to step S97.

(S96) The operation determination unit 111 calculates its relevant limit range as $min+(Pb-1)*y \leq p$ and exits from this process of limit range calculation.

Figure 24:
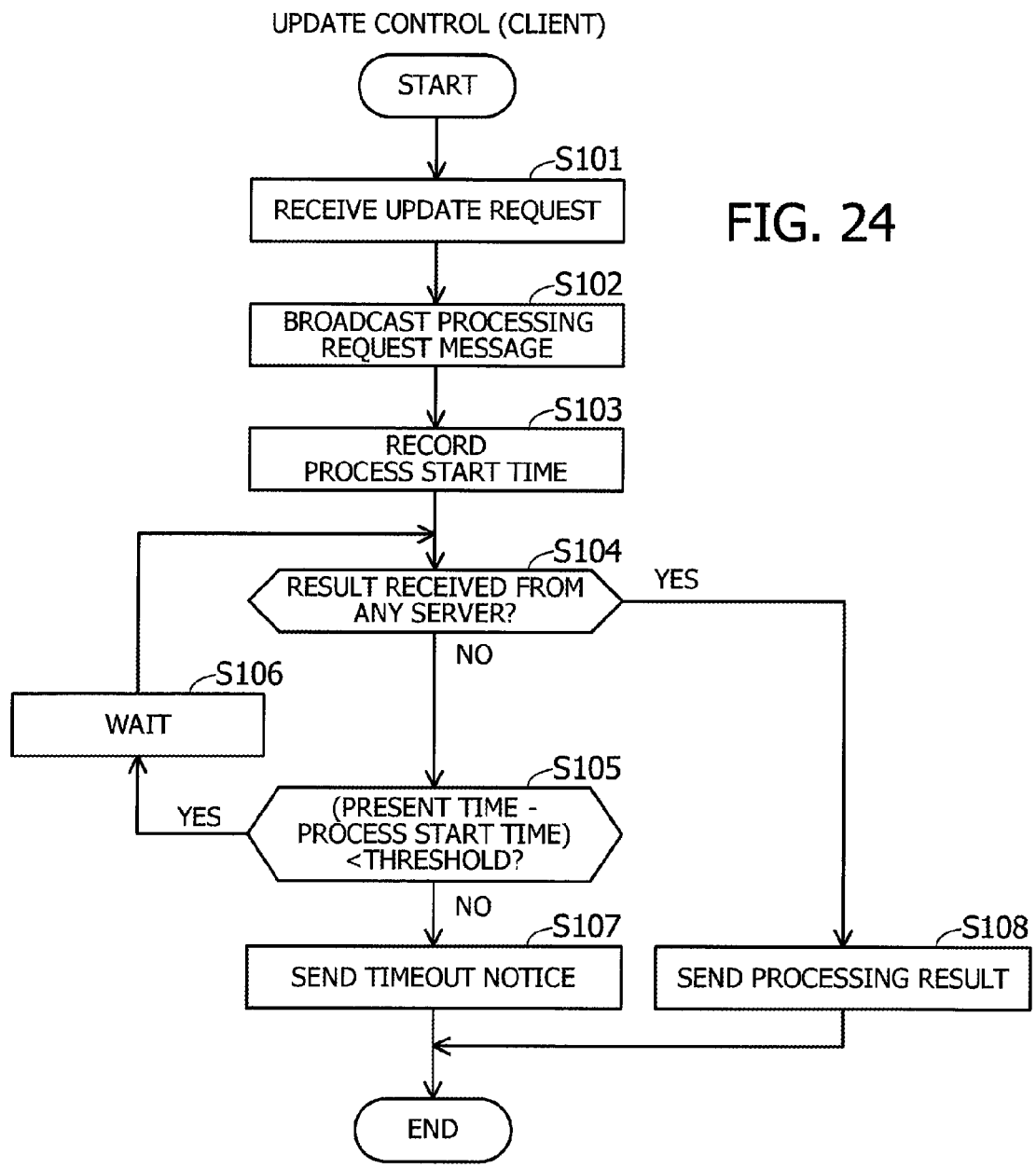
FIG. 24 is a flowchart exemplifying how a client device controls its database update operation.
Figure 25:
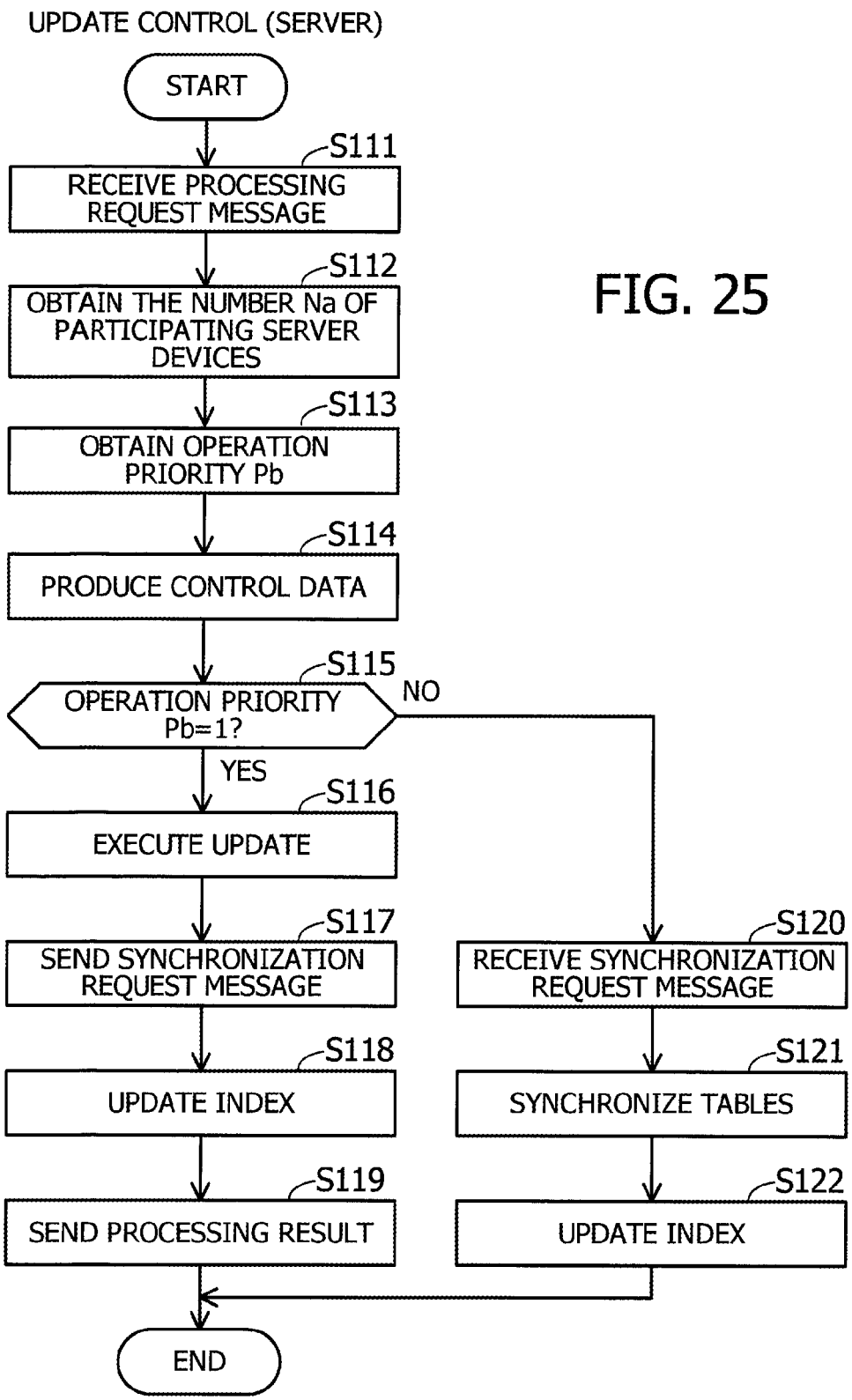
FIG. 25 is a flowchart exemplifying how a server device controls its database update operation.

(S97) The operation determination unit 111 calculates its relevant limit range as $min+(Pb-1)*y \leq p < min+Pb*y$ Referring now to FIGS. 24 and 25, the following section describes how the system updates a database.

FIG. 24 is a flowchart exemplifying how a client device controls its database update operation. Each operation in FIG. 24 is described below in the order of step numbers.

(S101) The processing request unit 221 receives an update request from the application software 210. This update request contains information that specifies, for example, what data values in which column of which table is to be updated under what conditions about the records, as well as what kind of change it is (e.g., insert, update, delete). The application software 210 may use SQL to describe such details of its request.

(S102) Based on the update request from the application software 210, the processing request unit 221 produces a processing request message 51 by populating its data fields in the following way.

The processing request unit 221 populates the control data field with message control parameters, the type field with a value representing what kind of change is requested, and the table field and column field with the distinguishing names of a specific table and a specific column to be updated, together with a new data value(s) for that column. The processing request unit 221 further populates the condition field with a conditional expression that narrows down the scope of records to be updated.

The processing request unit 221 then broadcasts or multicasts the produced processing request message 51 to a plurality of server devices (e.g., server devices 100, 100a, and 100b).

(S103) The execution result control unit 222 records the current time of day as "process start time" in a temporary storage space.

(S104) The execution result control unit 222 determines whether a processing result message 52 is received from one of the server devices. When there is a received processing result message 52, the process advances to step S108. When there is no processing result message 52 received, the process advances to step S105.

(S105) The execution result control unit 222 determines whether the difference between the process start time recorded at step S103 and the current time is smaller than a threshold. This difference represents how much time has passed since the transmission of the processing request message 51 at step S102. When the time difference is smaller than the threshold, the process advances to step S106 to wait for a processing result message 52 to come. When the time difference is greater than or equal to the threshold, the process proceeds to step S107.

(S106) The execution result control unit 222 waits for a certain amount of time (e.g., 10 ms or 100 ms). This wait time may be specified by the user of the proposed system, or may be previously given in a storage space of HDD or the like (e.g., configuration file) in the client device 200. The process then goes back to step S104 to check the reception of a processing result message 52.

(S107) The execution result control unit 222 notifies the application software 210 of timeout of the requested updated operation. The application software 210 handles this timeout of its update request and terminates this client-side process of update control.

(S108) The execution result control unit 222 looks into the processing result field of the received processing result message 52 to determine whether the update operation requested at step S102 has been executed successfully. The execution result control unit 222 then informs the application software 210 of the result.

FIG. 25 is a flowchart exemplifying how a server device controls its database update operation. The following description of FIG. 25 assumes that the illustrated steps are executed by the foregoing server device 100. Each operation in FIG. 25 is described below in the order of step numbers.

(S111) The operation determination unit 111 receives a processing request message 51 from the client device 200. The operation determination unit 111 checks the type field of this processing request message 51 to figure out what kind of change (e.g., insert, update, delete) it is requesting.

(S112) The operation determination unit 111 obtains the number Na of participating server devices.

(S113) The operation determination unit 111 obtains the operation priority Pb of the server device 100.

(S114) Based on the number Na of participating server devices and the operation priority Pb, the operation determination unit 111 produces control data for use in a processing result message 52 to be transmitted later. This step may, however, be executed immediately before transmission of a processing result message 52.

(S115) The operation determination unit 111 determines whether the operation priority Pb has a value of one. When the operation priority Pb is one (i.e., the server device 100 is an active server device), the process advances to step S116. When the operation priority Pb is not one (i.e., the server device 100 is a standby server device), the process advances to step S120.

(S116) The database control unit 112 executes the requested update operation based on the processing request message 51 received at step S111. More specifically, the database control unit 112 refers to the condition field and table field of the processing request message 51 to determine which record in which table to update.

(S117) The database control unit 112 sends a synchronization request message to other server devices, thereby requesting them to synchronize their tables with the updated table. This synchronization request message may include, for example, an update history of the database 120. The update history may describe what commands (or SQL statements) the database control unit 112 has done on the database 120. The update history may include the updated data as well.

(S118) The database control unit 112 updates the index corresponding to a particular column of the updated table, if it is present in the index storage unit 130. This index updating step may be skipped in some cases, but it depends on what change has actually been made to the table.

(S119) The database control unit 112 populates the control data field of the processing result message 52 with the control data produced at step S114. The processing result field is also populated with a piece of information indicating the result (e.g., completion) of the update operation at step S116. The database control unit 112 then sends out the processing result message 52 to the client device 200 and terminates this server-side process of update control.

(S120) The database control unit 112 does not execute the requested update in the processing request message 51, but delegates it to the active server device. Subsequently the database control unit 112 receives a synchronization request message from the active server device.

(S121) The database control unit 112 synchronizes its associated database 120 with the remote database in the active server device, so that the data designated by the synchronization request message is updated. For example, the database control unit 112 subjects the database 120 to what the active server device has done on its own database, according to the update history given by the received synchronization request message, so that the database 120 will be in the same state as its counterpart in the active sever device.

(S122) The database control unit 112 updates the index corresponding to a particular column of the updated table, if it is present in the index storage unit 130. This index updating step may be skipped in some cases, but it depends on what change has actually been made to the table.

Figure 26:
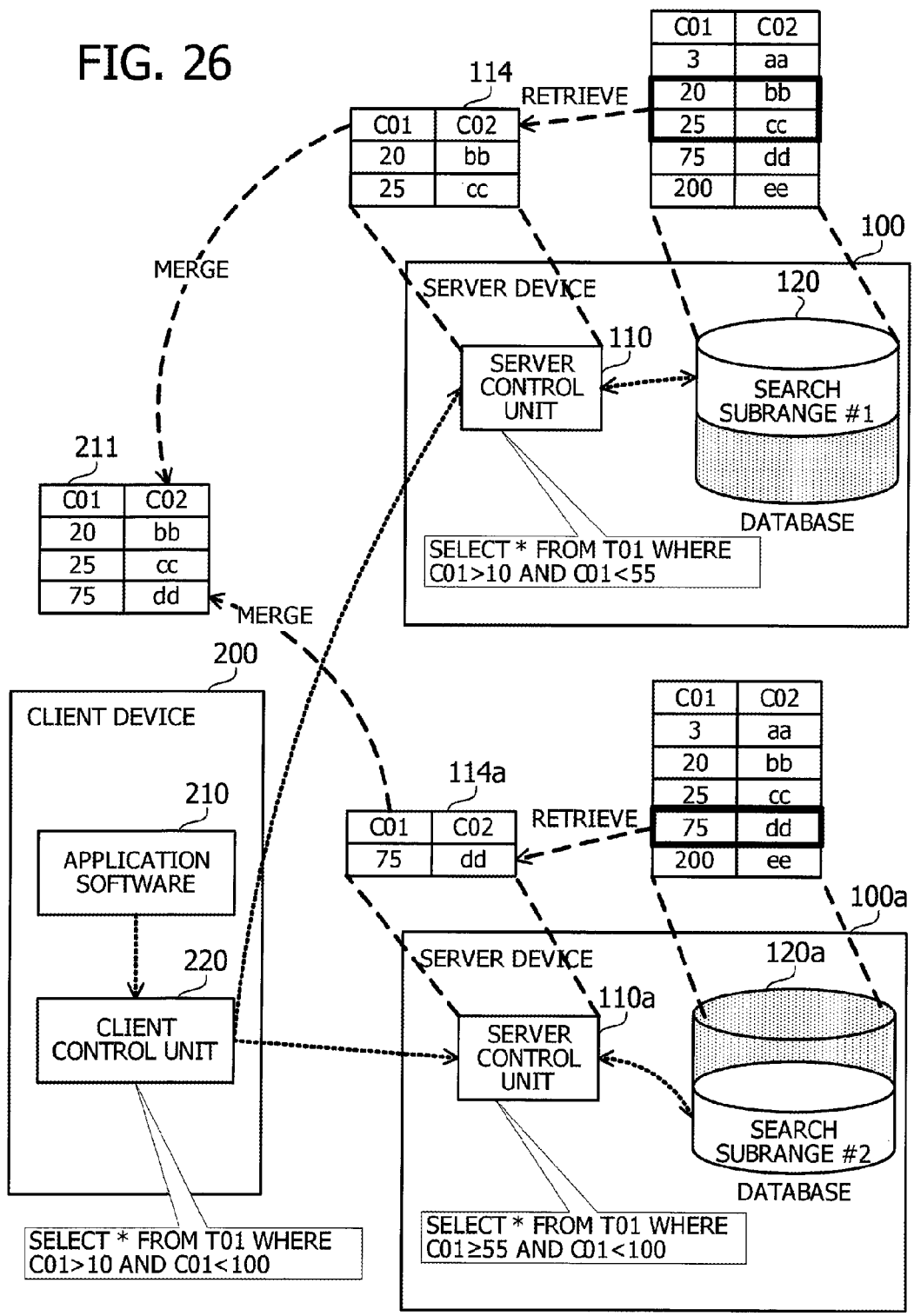
FIG. 26 illustrates an example of data retrieved with a non-index search.
Figure 27:
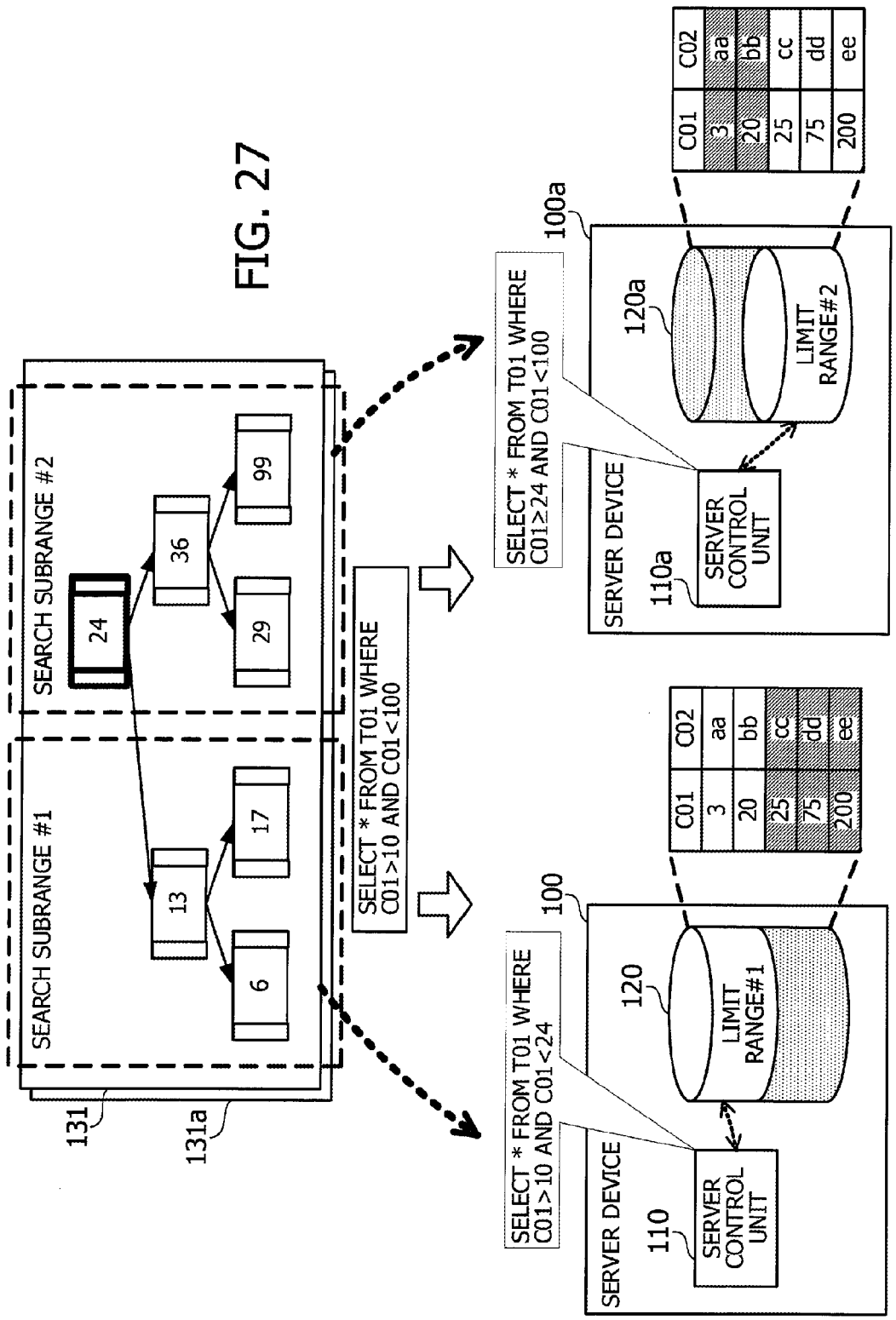
FIG. 27 illustrates an example of data retrieved with an index search.
Figure 28:
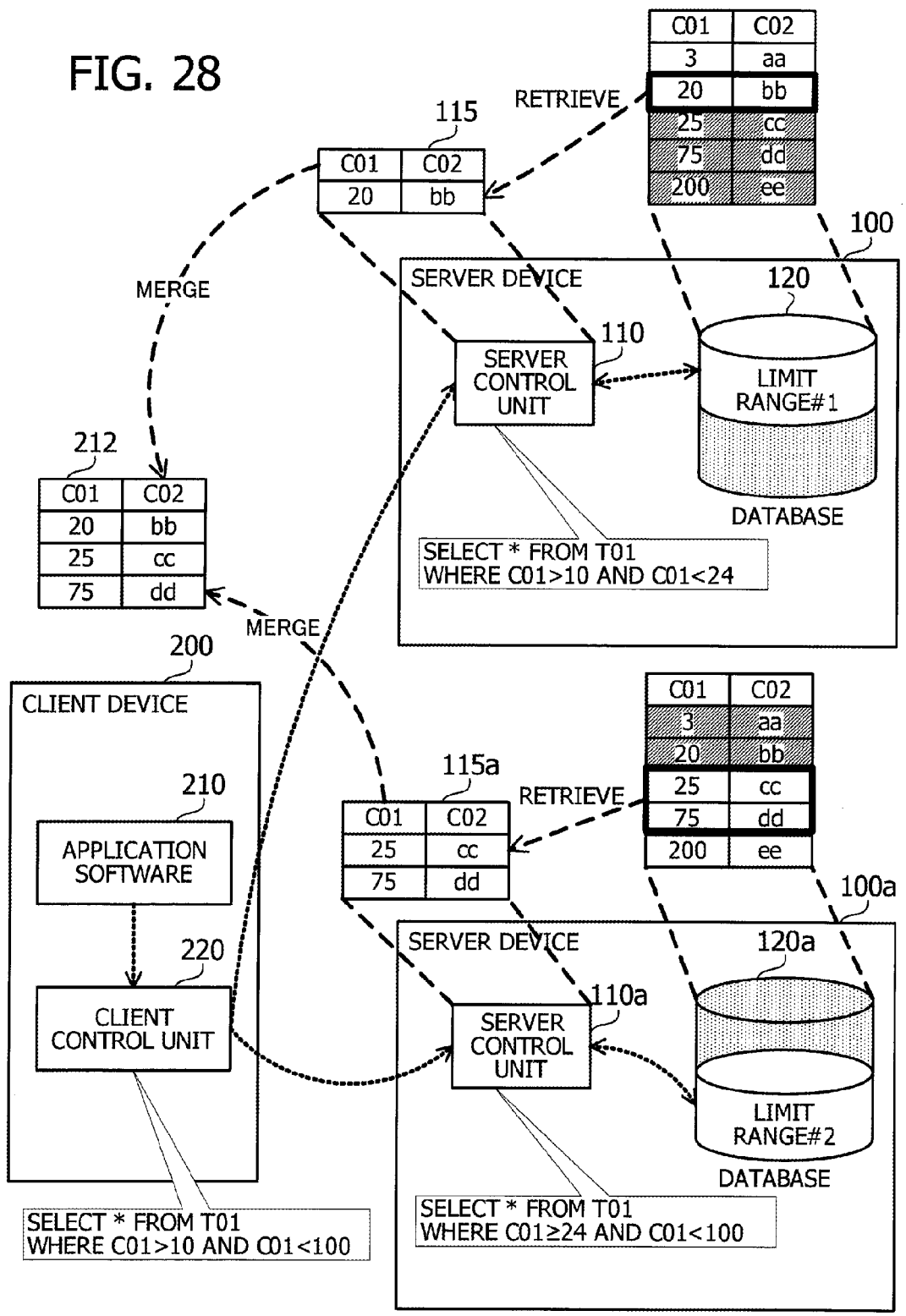
FIG. 28 gives a continuing part of the example of data retrieved with an index search.

Referring now to FIGS. 26 to 28, the next section will describe an example of data that the system searches according to the second embodiment.

FIG. 26 illustrates an example of data retrieved with a non-index search. The illustrated client device 200 is linked to two server devices 100 and 100a each having its own database 120 and 120a. These databases 120 and 120a have their own table T01, which is made up of two columns C01 and C02. The following description uses the notation of [v1, v2] to refer to a record of the databases 120 and 120a, where v1 and v2 are values in columns C01 and C02, respectively. For example, [20, bb] means a record containing "20" in column C01 and "bb" in column C02. Table T01 includes five records of [3, aa], [20, bb], [25, cc], [75, dd], and [200, ee]. The databases 120 and 120a have no index for column C01.

Suppose now that the client device 200 requests the server devices 100 and 100a to retrieve records satisfying 10<C01<100 from table T01. In response, the server devices 100 and 100a perform a non-index search on their table T01 in the way described below.

In one server device 100, the server control unit 110 calculates its search subrange #1 to be 10<C01<55, based on the search range specified by the client device 200, the number (2) of participating server devices, and the operation priority (1) of the server device 100. The server control unit 110 now executes a search operation, not over the entire search range, but in search subrange #1 of the database 120. As a result, the server control unit 110 extracts two records [20, bb] and [25, cc] from table T01. This search result 114 is sent to the client device 200.

In the other server device 100a, the server control unit 110a calculates its search subrange #2 to be 55≤C01<100, based on the specified search range, the number (2) of participating server devices, and the operation priority (2) of the server device 100a. The server control unit 110a now executes a search operation, not over the entire search range, but in search subrange #2 of the database 120a. As a result, the server control unit 110a extracts one record [75, dd] from table T01. This search result 114a is sent to the client device 200.

The client device 200 merges one search result 114, [20, bb] and [25, cc], from the former server device 100 with the other search result 114a, [75, dd] from the latter server device 100a. More specifically, the client device 200 concatenates the two search results 114 and 114a into a single list of records. This merged search result 211 is supplied to the application software 210 as a response to its search request.

FIG. 27 illustrates an example of data retrieved with an index search. FIG. 27 and subsequent FIG. 28 assume a database setup similar to the one discussed above in FIG. 26. See the previous description of FIG. 26 for details. Two databases 120 and 120a have their respective indexes 131 and 131a for column C01, the root node having a key value of 24.

Suppose now that the client device 200 requests the server devices 100 and 100a to retrieve records satisfying a condition 10<C01<100 for column values, similarly to the case of FIG. 26. In response, the server devices 100 and 100a perform an index search on their table 101 in the way described below.

In one server device 100, the server control unit 110 calculates its limit range #1 to be C01<24, based on the index 131, the number (2) of participating server devices, and the operation priority (1) of the server device 100. It appears to the server device 100 that the database 120 contains a virtual partition formed from two records of [3, aa] and [20, bb], but not including [25, cc], [75, dd] or [200, ee].

In the other server device 100a, the server control unit 110a calculates its limit range #2 to be 24≤C01, based on the index 131a, the number (2) of participating server devices, and the operation priority (2) of the server device 100a. It appears to the server device 100a that its database 120a contains a virtual partition formed from three records [25, cc], [75, dd], and [200, ee], but not including [3, aa] or [20, bb].

FIG. 28 gives a continuing part of the example of data retrieved with an index search. The server control unit 110 finds a range 10<C01<24 as being an overlap between limit range #1 and the search range specified by the client device 200, and thus selects it as search subrange #1. The server control unit 110 now performs a search operation, not over the entire search range, but in this search subrange #1 of the database 120. As a result, the server control unit 110 extracts one record [20, bb] from table T01. This search result 115 is sent to the client device 200.

Similarly to the above, the server control unit 110a finds a range 24≤C01<100 as being an overlap between limit range #2 and the search range specified by the client device 200, and thus selects it as search subrange #2. The server control unit 110a executes a search operation, not over the entire search range, but in search subrange #2 of the database 120a. As a result, the server control unit 110a extracts two records [25, cc] and [75, dd] from table T01. This search result 115a is sent to the client device 200.

The client device 200 merges one search result 115, [20, bb], from the former server device 100 with the other search result 115a, [25, cc] and [75, dd], from the latter server device 100a. More specifically, the client device 200 concatenates the two search results 115 and 115a into a single list of records. This merged search result 212 is supplied to the application software 210 as a response to its search request.

Figure 29:
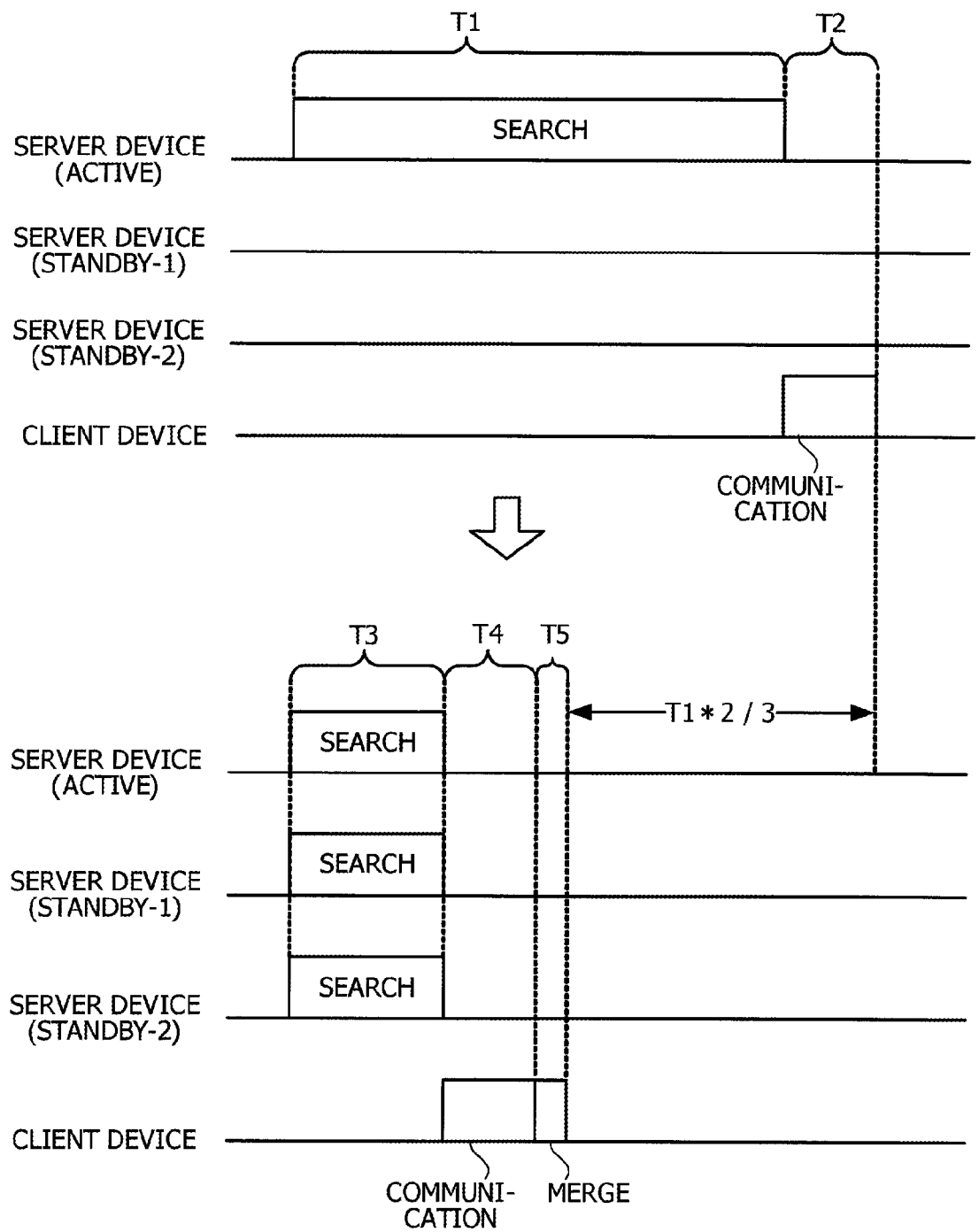
FIG. 29 illustrates an example of how search operations progress with time in the proposed system.

FIG. 29 illustrates an example of how search operations progress with time in the proposed system. FIG. 29 assumes a system formed from three server devices, one active server and two standby servers, with synchronized datasets. A client device sends a search request to this system and receives a search result from the system as follows.

For the purpose of comparison, the upper half of FIG. 29 illustrates an example of processing time of a search request executed by some other system than the proposed system of the second embodiment. In this example, the active server device is the only device that executes search operations. As seen in FIG. 29, the active server device consumes time T1 to execute a search operation and time T2 to communicate with the requesting client device to deliver the search result. From the viewpoint of application software on the client device, the response time of this system is T1 +T2.

The lower half of FIG. 29 illustrates an example of processing time of a search request executed by the proposed system of the second embodiment. Three server devices consume time T3 to perform a search operation, and time T4 to send their respective search results to the client device. Time T5 is used by the client device to merge the received search results. From the viewpoint of application software on the client device, the response time of this system is T3 +T4 +T5.

Time T3 is about one third as long as time T1 because the proposed system executes a search operation with three server devices running in parallel. Time T4 is nearly the same as time T2 since there are no significant differences between the two systems in terms of the total amount of searched data. Time T4 is expected to be sufficiently small with respect to time T3 . Time T5 for merging data is also significantly small with respect to T3 . The comparison between the upper half and lower half of FIG. 29 indicates that the proposed system cuts down the response time of the other system by two thirds of T1 . The overall response time is expected to decrease to about one third when each server device has a relatively high load.

According to the second embodiment described above, the proposed system permits a client device 200 to send server devices 100, 100a, and 100b a request for data search operation with the same specified search conditions. The search conditions include a specific search range, and each server device determines which segment of this search range to undertake, based on its own operation priority, the number of participating server devices, and the like. The servers perform a search operation on their respective search subranges. The sever devices 100, 100a, and 100b then send their respective search results back to the requesting client device 200. The client device 200 merges the received search results into a single set of data and supplies it to application software. The proposed system enhances the speed of data search and serves the client device 200 with reduced response times.

The server devices 100, 100a, and 100b are configured to search, not a common database, but their own databases 120, 120a, and 120b to avoid access conflicts and thus increase the throughput. Since these databases 120, 120a, and 120b are kept synchronized, failure in a server would not affect the remaining servers' database access, thus providing an enhanced fault tolerance. The server devices determine their search subranges so as not to overlap with each other, thus permitting themselves to execute search operations without needless duplication.

When determining search subranges, each server device uses a tree-structured index, such as B-tree, which is expected to substantially equalize the load of searching across different search subranges (e.g., the amount of data falling in each different search subrange). This feature enables the server devices to perform their search operations in nearly equal times, thus reducing possible delay of response due to unevenness of search processing times. The proposed system therefore enables faster database search.

(c) Third Embodiment

This section describes a third embodiment, focusing upon its differences from the foregoing second embodiment. See the previous description of the second embodiment for similar elements. The system of the third embodiment is different from the one of the second embodiment in its structure of database index that each server device uses to calculate its responsible search range, or limit range.

For example, the foregoing second embodiment produces an index in such a way that the number of key values in its root node will be the number of participating server devices minus one. Consequently the index has to be reformed each time the number of participating server devices changes as a result of server failure or recovery.

In contrast, the third embodiment eliminates the need for server devices to reform their indexes even if the number of participating server devices is changed. The third embodiment assumes, however, that the number of participating server devices may vary within the range from one to the initial number of server devices at the time of deployment of the system. In other words, the number of server devices is supposed not to exceed the original number of deployed server devices. As long as this condition is met, failure of a server or recovery from the same would not lead to reforming of the index in the server devices.

Figure 30:
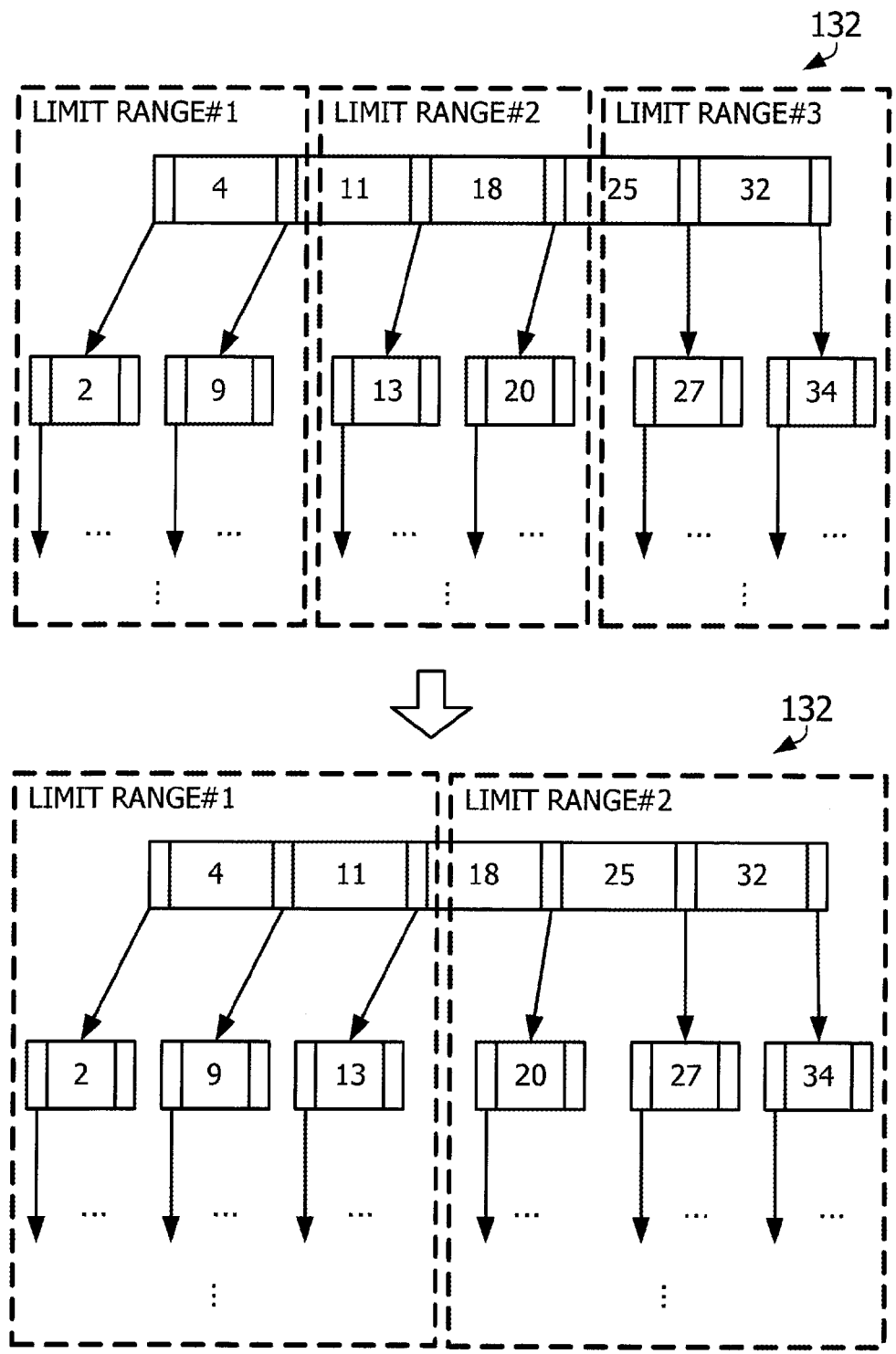
FIG. 30 illustrates another example of an index.

FIG. 30 illustrates another example of an index. The illustrated index 132 is a variation of the index 131 discussed in FIG. 6 for the second embodiment. Let x represent the initial number of participating server devices at the time of deployment of the system. When x is greater than or equal to two, the index 132 is produced in such a way that the root node will have as many keys as the minimum common multiple of natural numbers from one to x, minus one. The number of keys becomes zero when x=1. The index 132 in this case is produced with at least one key in the root node.

Suppose, for example, that the system has originally been set up with three participating server devices. For x=3, the minimum common multiple of natural numbers from 1 to x (i.e., 1, 2, 3) is 6. Then the number of root node keys is calculated as 6−1=5.

As seen from the above example, the number of root node keys is defined to be the minimum common multiple of natural numbers from one to x, minus one. This embodiment eliminates the need for reforming the index even if some server devices are failed. For example, the index 132 illustrated in FIG. 30 has five keys 4, 11, 18, 25, and 32 in its root node. Three server devices execute a search operation in parallel, with their respective limit ranges of p<11, 11≤p<25, and 25≤p as seen in the upper half of FIG. 30. If one of these server devices fails, the remaining two server devices reestablishes new limit ranges, p<18 and 18≤p from the same index tree structure, as seen in the lower half of FIG. 30.

It is noted that the number of root node keys plus one is exactly divisible by any natural number ranging from one to the original number of server devices. This is why the given search range can be distributed across the operating server devices regardless of how many of them may fail. It is therefore possible for the server devices to share their load of search operations almost evenly, without reforming the index 132.

Figure 31:
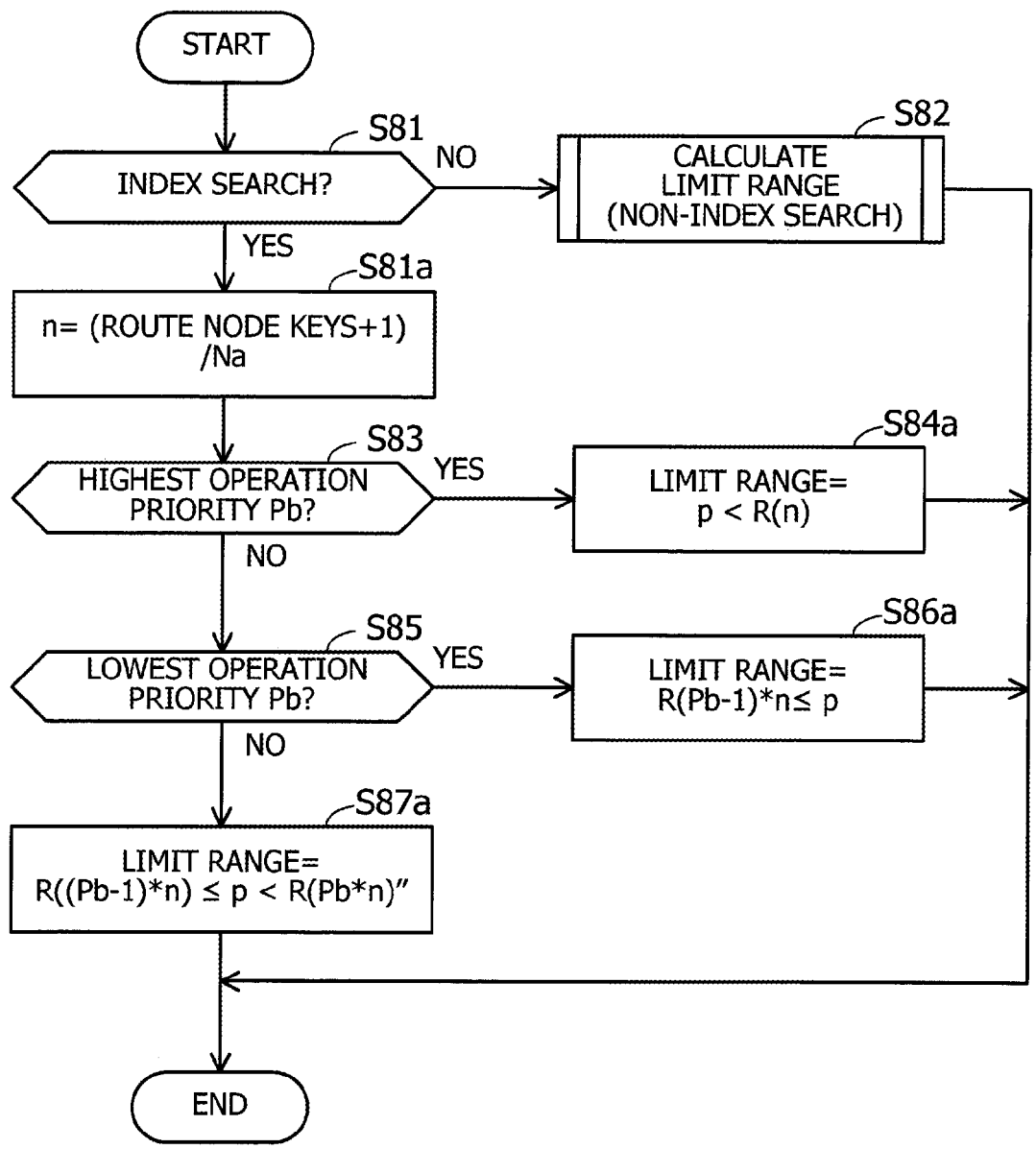
FIG. 31 is a flowchart illustrating a variation of how limit ranges are calculated.

FIG. 31 is a flowchart illustrating a variation of how limit ranges are calculated. The process of FIG. 31 is called up at the foregoing step S49 in FIG. 20 and executed as an alternative to the limit range calculation of FIG. 22 for the second embodiment. One difference from the second embodiment is that step S81a is inserted between step S81 and step S83. Another is that steps S84, S86, and S87 are replaced with steps S84a, S86a, and S87a, respectively. The following description explains these steps S81a, S84a, S86a, and S87a.

(S81a) The operation determination unit 111 calculates a variable n as (x+1)/Na, where x is the number of root node keys, and Na is the number of participating server devices.

(S84a) The operation determination unit 111 determines its limit range as p<R(n) and exits from the process of limit range calculation.

(S86a) The operation determination unit 111 determines its limit range as R((Pb−1)*n)≤p and exits from the process of limit range calculation.

(S87a) The operation determination unit 111 determines its limit range as R((Pb−1)*n)≤p<R(Pb*n).

As can be seen from FIGS. 30 and 31, the proposed server devices determine their limit ranges, and then their search subranges, by using an index configured to have as many root node keys as the minimum common multiple of natural numbers from one to x, minus one. This third embodiment eliminates the need for server devices to reform their indexes, no matter how the number of participating server devices may change, thus alleviating their processing load.

The system of the third embodiment may be modified to use a common multiple of natural numbers from one to x, instead of the minimum common multiple of the same, without sacrificing the above-noted advantages. For example, this alternative quantity may be N times the minimum common multiple of natural numbers from one to x, where N is an integer greater than one. Another example may be the product of natural numbers from one to x.

(d) Fourth Embodiment

This section describes a fourth embodiment, focusing upon its difference from the foregoing second embodiment. See the previous description of the second embodiment for similar elements. In this fourth embodiment, the system distributes the tasks of update and search operations to server devices in a different way from the second embodiment.

FIG. 32 illustrates a variation of functional structure of server devices. The illustrated system of the fourth embodiment includes server devices 100-1, 100a-1, and 100b-1. The topmost server device 100-1 in FIG. 32 acts as an active server device. According to the fourth embodiment, the active server device undertakes update operations, but not search operations. For this reason, the active server device 100-1 does not need indexes 131a, 131b, or the like.

The remaining two server devices 100a-1 and 100b-1 are standby server devices. According to the fourth embodiment, the standby server devices undertake search operations, but not update operations. These server devices 100a-1 and 100b-1 are capable of running in parallel to achieve a search operation. One standby server device 100a-1 has its index 131a-1, and the other standby server device 100b-1 has its index 131b-1. Each of these two indexes 131a-1 and 131b-1 has as many root node keys as the number of participating server devices minus one. Referring to the example of FIG. 32, the number of participating server devices is two, because it is only the standby server devices 100a-1 and 100b-1 that participate in search operations. Consequently the root node has only one key.

FIG. 33 illustrates a variation of how the proposed system executes a search. The active server device 100-1 includes a server control unit 110-1. The standby server devices 100a-1 and 100b-1 include server control units 110a-1 and 110b-1, respectively. These server control units 110-1, 110a-1, 110b-1 correspond to the foregoing server control units 110, 110a, and 110b of the second embodiment.

The client device 200 sends a search request to each server device 100-1, 100a-1, and 100b-1, specifying the same search conditions (S2, S2a, S2b). The server control unit 110-1 in the active server device 100 does not execute the requested search operation or respond to the client device 200.

On the other hand, the server control units 110a-1 and 110b-1 determine their respective search subranges based on the assigned active/standby status and the number of participating server devices. For example, the server control units 110a-1 and 110b-1 obtain their "search subrange #1 " and "search subrange #2 " (S3a-1, S3b-1). The server control unit 110a-1 then searches its attached database 120a for specified data only within the search subrange #1 , thus sending its partial search result to the client device 200 (S4a). Similarly, the server control unit 110b-1 searches its attached database 120b for specified data only within the search subrange #2 , thus sending its partial search result to the client device 200 (S4b).

According to the fourth embodiment, the proposed system exclusively assigns update operations to the active server device 100-1 and search operations to standby server devices 100a-1 and 100b-1. This feature makes it possible to distribute the tasks of data update and parallel search operations among a plurality of server devices 100-1, 100a-1, and 100b-1 in an appropriate fashion, while alleviating the load of the active server device 100-1.

As previously mentioned, the proposed information processing of the first embodiment may be achieved by causing first and second servers 10 and 10a and a search-requesting device 20 to execute their programs. Similarly, the proposed information processing of the second and third embodiments may be achieved by causing server devices 100, 100a, and 100b and a client device 200 to execute their programs. The proposed information processing of the fourth embodiment may be achieved by causing server devices 100-1, 100a-1, and 100b-1 to execute their programs. These programs may be recorded on some computer-readable storage media (e.g., storage medium 43 in FIG. 3). The storage media may be, for example, magnetic disk media, optical discs, magneto-optical discs, or semiconductor memory devices. The magnetic disk media include FD and HDD. Optical discs include, for example, CD, CD-Recordable (CD-R), CD-Rewritable (CD-RW), DVD, DVD-R, and DVD-RW.

Portable storage media may be used for distribution of programs. For example, software programs are installed from a portable storage medium to a storage device (e.g., HDD 103) in a computer. The computer reads out these programs from the storage device and executes them. It is also possible to execute programs read out of a portable storage medium without installing them. It is further noted that the above processing functions may be executed wholly or partly by a DSP, ASIC, programmable logic device (PLD), or other electronic circuits, or their combinations.

In one aspect of the embodiments, the proposed techniques make parallelization of search operations less sensitive to variations of the number of servers.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A database system comprising:
   a plurality of servers each coupled to a different one of a plurality of databases, the plurality of databases storing same data, the plurality of servers including a first server coupled to a first database and a second server coupled to a second database; and
   a search-requesting device configured to send a plurality of search requests to the respective servers, the plurality of search requests specifying a same search range, the plurality of search requests including a first search request to the first server and a second search request to the second server;
   wherein the first server is configured to calculate a first search subrange from the same search range specified in the first search request, to search only a first subset of the same data corresponding to the first search subrange from the first database, and to send the first subset back to the search-requesting device, and
   wherein the second server is configured to calculate a second search subrange from the same search range specified in the second search request, to search only a second subset of the same data corresponding to the second search subrange from the second database while ignoring the first subset stored in the second database, and to send the second subset back to the search-requesting device.

2. The database system according to claim 1, wherein the first and second servers calculate the respective first and second search subranges so as to avoid overlap therebetween.

3. The database system according to claim 1, wherein:
   the servers have access to an index tree in which a plurality of nodes are linked in tree structure form, each node containing one or more key values; and
   the first and second servers calculate the respective first and second search subranges based on the index tree.

4. The database system according to claim 3, wherein the first and second servers calculate the respective first and second search subranges by dividing the same search range, based on key values registered in a root node of the index tree or branch nodes whose depths from the root node in the index structure are within a predetermined limit.

5. The database system according to claim 3, wherein each of the servers produces the index tree whose root node includes as many key values as determined from a number of servers participating in search operations.

6. The database system according to claim 5, wherein:
   the root node of the index tree includes a greater number of key values than the number of servers; and
   each of the servers participating in search operations continues to use the produced index tree even when the number of servers is changed.

7. The database system according to claim 1, wherein each server has information indicating a priority level of said each server, and the first and second servers calculate the respective first and second search subranges based on the priority level and a number of servers participating in search operations.

8. The database system according to claim 1, wherein the search-requesting device discards the search results received from the servers and retransmits the plurality of search requests when a change is detected in a number of servers participating in search operations before the search results arrive from all the participating servers.

9. A method for searching databases, the method comprising:
   sending a plurality of search requests from a search-requesting device to respective servers each coupled to a different one of a plurality of databases, the plurality of databases storing same data, the servers including a first server coupled to a first database and a second server coupled to a second database, the plurality of search requests specifying a same search range, the plurality of search requests including a first search request to the first server and a second search request to the second server;
   calculating, by the first server, a first search subrange from the same search range specified in the first search request;
   searching, by the first server, only a first subset of the same data corresponding to the first search subrange from the first database;
   sending the first subset from the first server to the search-requesting device;
   calculating, by the second server, a second search subrange from the same search range specified in the second search request;
   searching, by the second server, only a second subset of the same data corresponding to the second search subrange from the second database while ignoring the first subset stored in the second database; and
   sending the second subset from the second server to the search-requesting device.

10. A non-transitory computer-readable storage medium storing a program to be executed by a computer serving as one of a plurality of servers, the program causing the computer to perform a procedure comprising:
    receiving one of a plurality of search requests, the plurality of search requests specifying a same search range, wherein a search requesting device has sent the plurality of search requests to the respective servers, each of the plurality of servers coupled to a different one of a plurality of databases that store same data;
    calculating a search subrange from the same search range specified in the received one of the plurality of search requests;

searching only a subset of the same data corresponding to the calculated search subrange from the database coupled to the server while ignoring another subset of the same data stored in the database, said another subset corresponding to another search subrange that is to be calculated from the same search range by another server; and sending the subset of the same data to the search-requesting device.

* * * * *